US010510170B2

(12) United States Patent
Lee et al.

(10) Patent No.: US 10,510,170 B2
(45) Date of Patent: Dec. 17, 2019

(54) ELECTRONIC DEVICE AND METHOD FOR GENERATING IMAGE FILE IN ELECTRONIC DEVICE

(71) Applicant: Samsung Electronics Co., Ltd., Suwon-si, Gyeonggi-do (KR)

(72) Inventors: Ja Kyoung Lee, Seoul (KR); Kyu Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 15/163,272

(22) Filed: May 24, 2016

(65) Prior Publication Data

US 2016/0358359 A1    Dec. 8, 2016

(30) Foreign Application Priority Data

Jun. 2, 2015 (KR) .................. 10-2015-0078156

(51) Int. Cl.
| | |
|---|---|
| *G06F 17/00* | (2019.01) |
| *G06T 11/60* | (2006.01) |
| *G06F 3/0484* | (2013.01) |
| *G06F 3/0482* | (2013.01) |
| *H04N 1/32* | (2006.01) |
| *H04N 1/387* | (2006.01) |
| *H04N 1/21* | (2006.01) |

(52) U.S. Cl.
CPC ............ *G06T 11/60* (2013.01); *G06F 3/0482* (2013.01); *G06F 3/04847* (2013.01); *H04N 1/2116* (2013.01); *H04N 1/32* (2013.01); *H04N 1/387* (2013.01); *G06T 2200/24* (2013.01)

(58) Field of Classification Search
CPC ... G06T 11/60; G06T 2200/24; G06F 3/0482; G06F 3/04847; G06F 17/30038; G06F 17/30244; G06F 17/30386; G06F 17/30722; G06F 17/30867; H04N 1/32; H04N 1/387; H04N 1/2116
USPC .................................................. 715/231, 731
See application file for complete search history.

(56) References Cited

U.S. PATENT DOCUMENTS

| | | | |
|---|---|---|---|
| 4,680,643 | A | 7/1987 | Horiguchi |
| 5,815,645 | A | 9/1998 | Fredlund et al. |
| 7,474,348 | B2 | 1/2009 | Suzuki et al. |

(Continued)

FOREIGN PATENT DOCUMENTS

| | | |
|---|---|---|
| CN | 102347045 A | 2/2012 |
| CN | 104202661 A | 12/2014 |

(Continued)

OTHER PUBLICATIONS

CN Office Action dated Jan. 11, 2019 issued in CN Patent Application 201610384197.2.

*Primary Examiner* — Jason T Edwards
(74) *Attorney, Agent, or Firm* — Jefferson IP Law, LLP

(57) ABSTRACT

An electronic device is provided. The electronic device includes a memory to store a plurality of images which are discontinuously captured and a processor to select at least some of the plurality of images, generate an image combination file in a format for sequentially playing the selected images by combining the selected images, and store the image combination file in the memory. The device can further provide a display to add, delete and arrange images of the image combination files.

17 Claims, 14 Drawing Sheets

(56) References Cited

U.S. PATENT DOCUMENTS

| | | | |
|---|---|---|---|
| 7,882,258 B1* | 2/2011 | Sumler | G11B 27/034 709/231 |
| 7,970,240 B1* | 6/2011 | Chao | G06F 17/30274 382/305 |
| 8,725,800 B1 | 5/2014 | Chan et al. | |
| 8,891,883 B2 | 11/2014 | Murphy-Chutorian et al. | |
| 9,300,841 B2 | 3/2016 | Askan | |
| 9,311,530 B1 | 4/2016 | Murphy-Chutorian et al. | |
| 9,459,311 B2 | 10/2016 | Michal | |
| 2001/0015762 A1* | 8/2001 | Suzuki | H04N 1/0044 348/333.05 |
| 2006/0036960 A1* | 2/2006 | Loui | G06F 17/30265 715/764 |
| 2006/0103891 A1* | 5/2006 | Atkins | H04N 1/00132 358/450 |
| 2006/0204141 A1 | 9/2006 | Modrall et al. | |
| 2008/0235595 A1* | 9/2008 | Krantz | G11B 27/036 715/741 |
| 2008/0306921 A1* | 12/2008 | Rothmuller | G06F 17/30038 |
| 2009/0256924 A1 | 10/2009 | Lee et al. | |
| 2009/0280859 A1 | 11/2009 | Bergh | |
| 2012/0062766 A1 | 3/2012 | Park | |
| 2013/0089243 A1* | 4/2013 | Sauve | G06F 17/30038 382/118 |
| 2014/0089816 A1* | 3/2014 | DiPersia | G06F 3/0484 715/753 |
| 2014/0136611 A1 | 5/2014 | Chan et al. | |
| 2014/0298265 A1 | 10/2014 | Osmond | |
| 2014/0301653 A1 | 10/2014 | Murphy-Chutorian et al. | |
| 2014/0313527 A1 | 10/2014 | Askan | |
| 2014/0317480 A1 | 10/2014 | Chau et al. | |
| 2014/0324797 A1* | 10/2014 | Yung | G06Q 50/01 707/692 |
| 2015/0007024 A1 | 1/2015 | Jeong et al. | |
| 2015/0130816 A1* | 5/2015 | Vigneras | G06T 13/80 345/473 |
| 2016/0125062 A1* | 5/2016 | Karlsson | G06F 17/30265 707/737 |

FOREIGN PATENT DOCUMENTS

| | | |
|---|---|---|
| EP | 0 822 710 A2 | 2/1998 |
| EP | 1128656 A2 | 8/2001 |
| EP | 2 432 209 A1 | 3/2012 |
| EP | 2 819 388 A1 | 12/2014 |
| EP | 2819288 A1 | 12/2014 |
| KR | 2000-0036810 A | 7/2000 |
| KR | 10-2009-0039404 A | 4/2009 |
| WO | 2009/138135 A1 | 11/2009 |

* cited by examiner

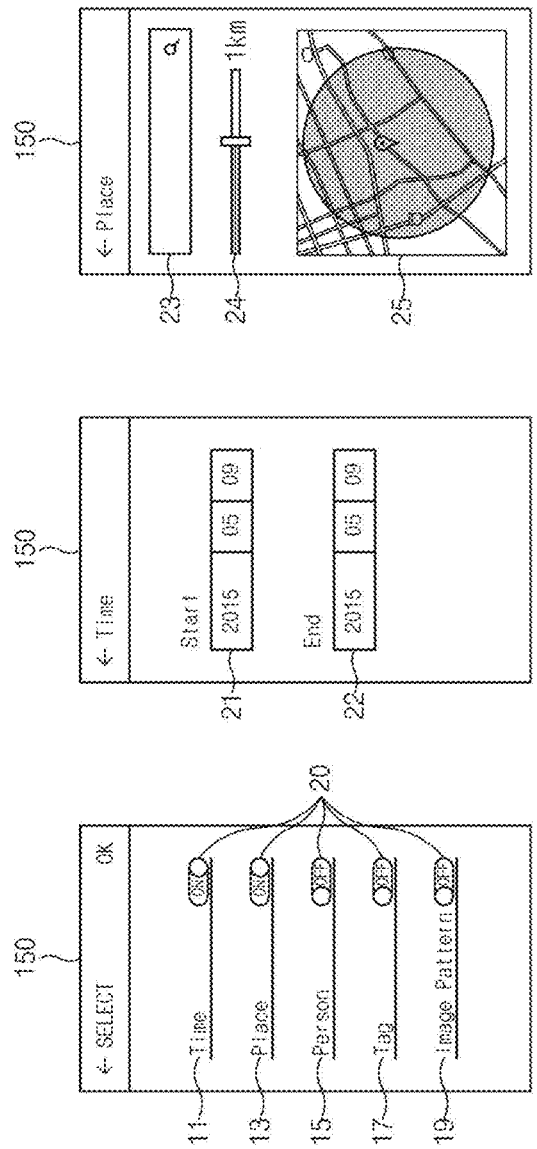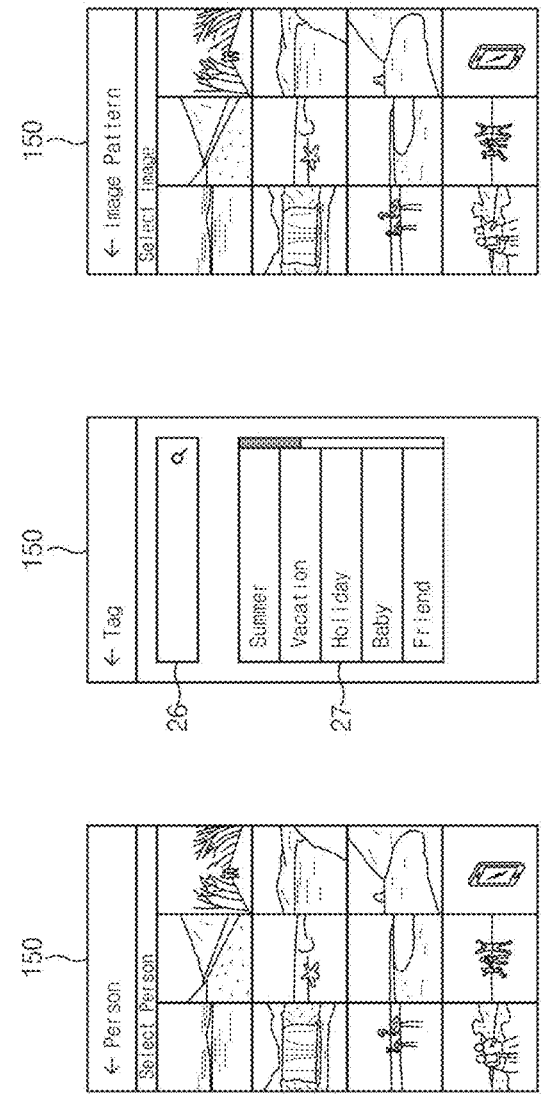

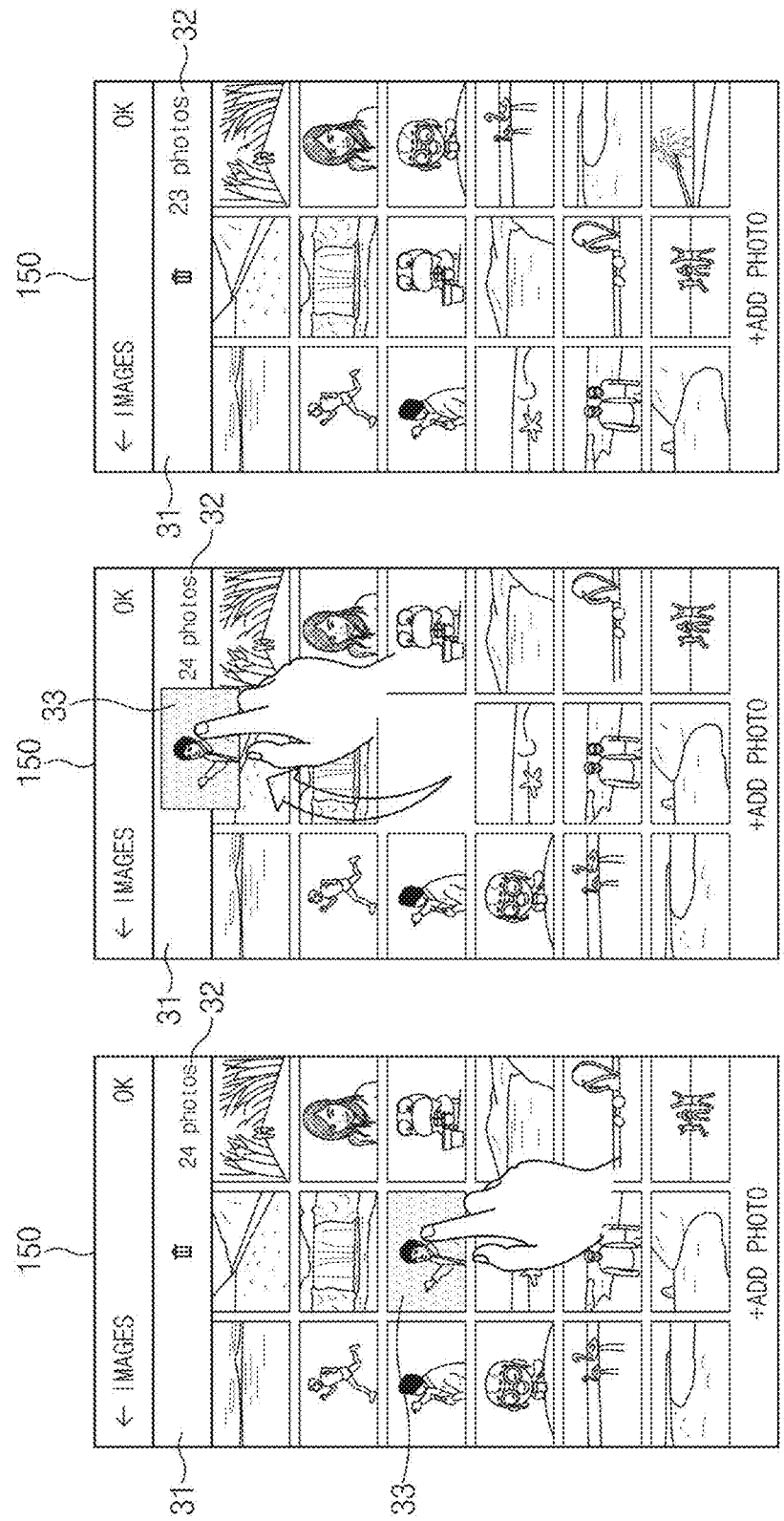

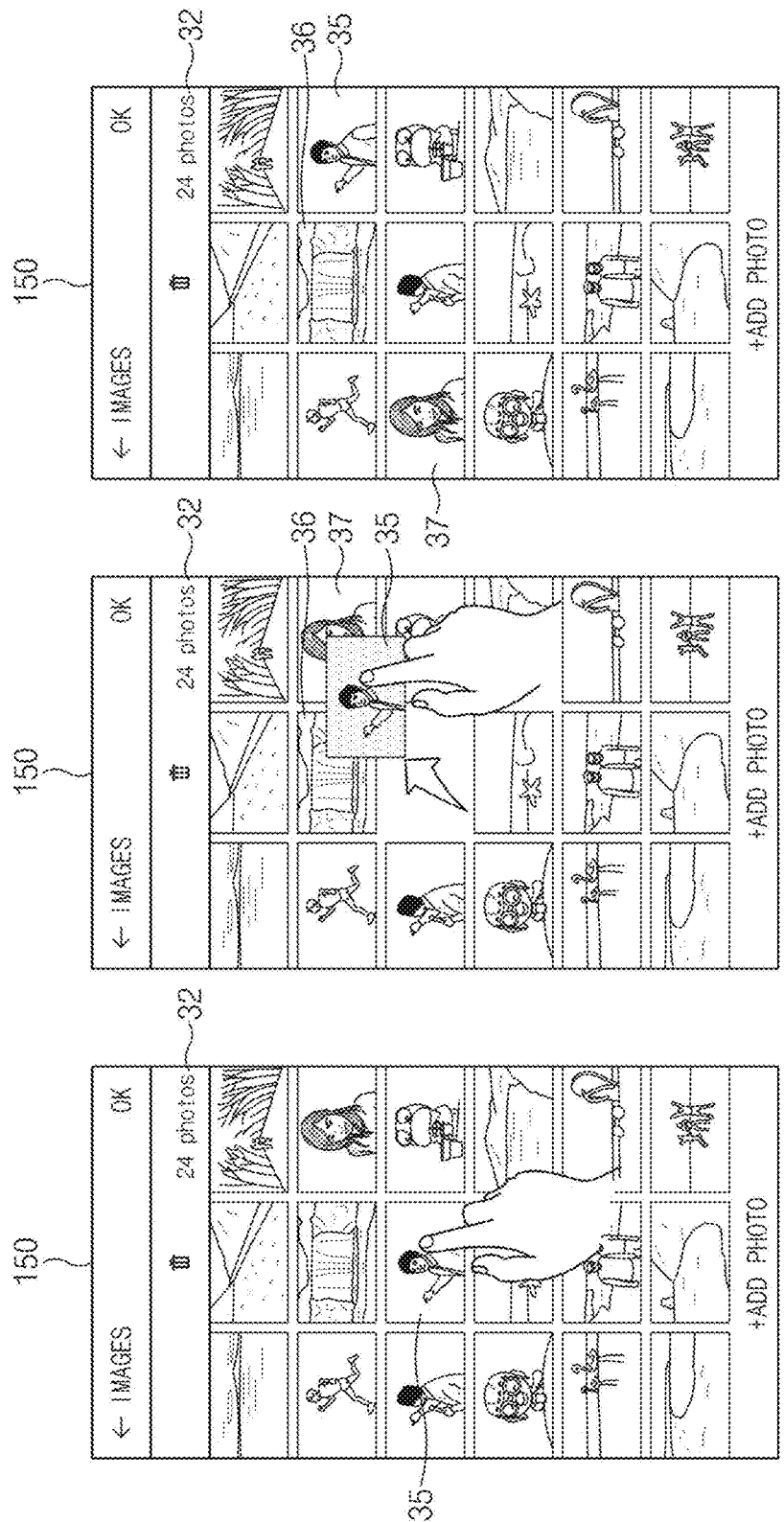

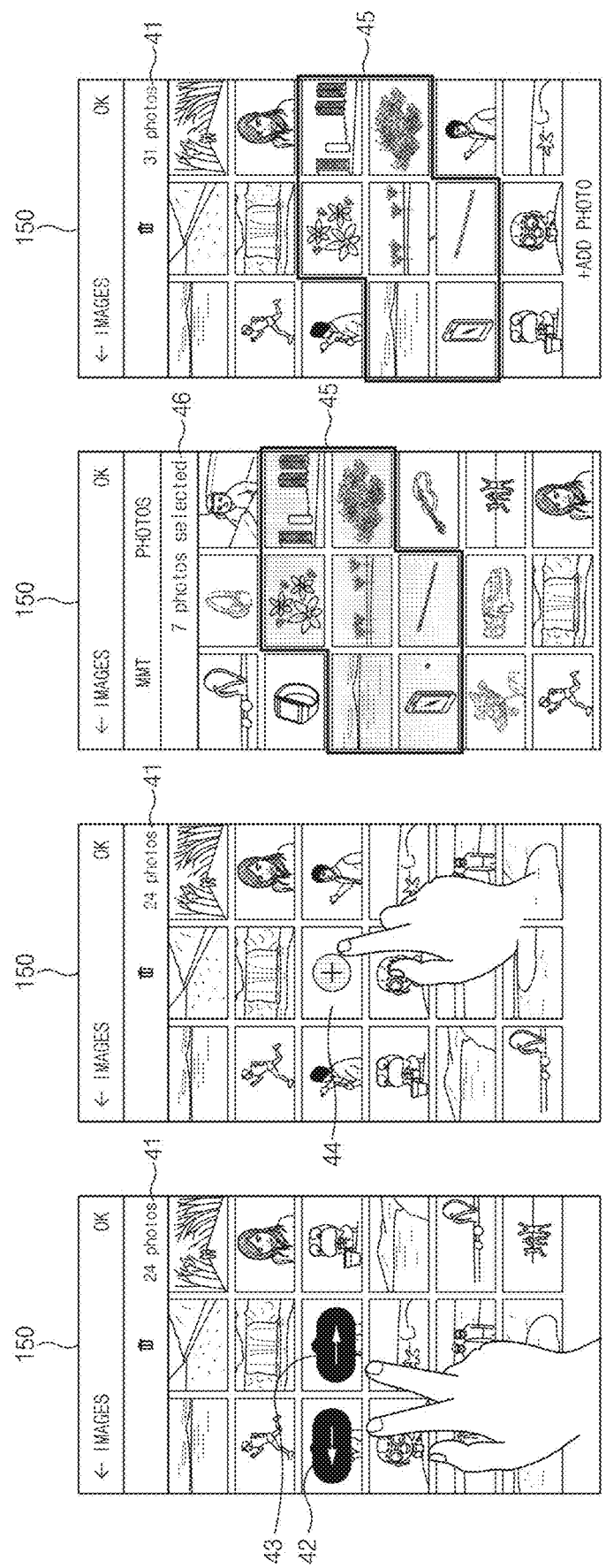

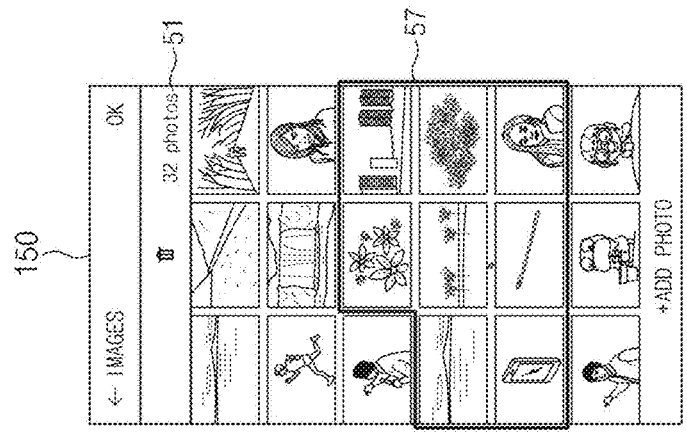
FIG. 8A
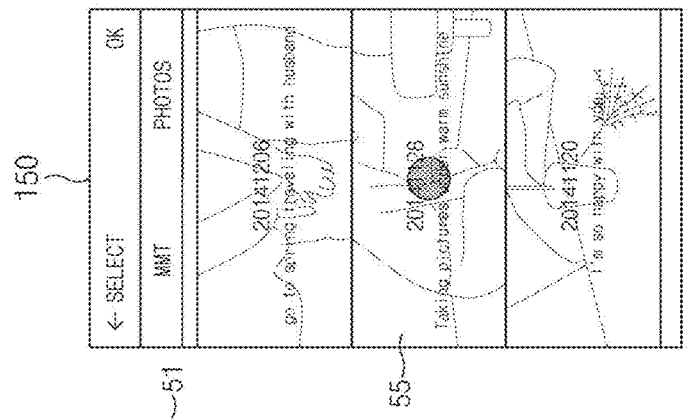
FIG. 8B
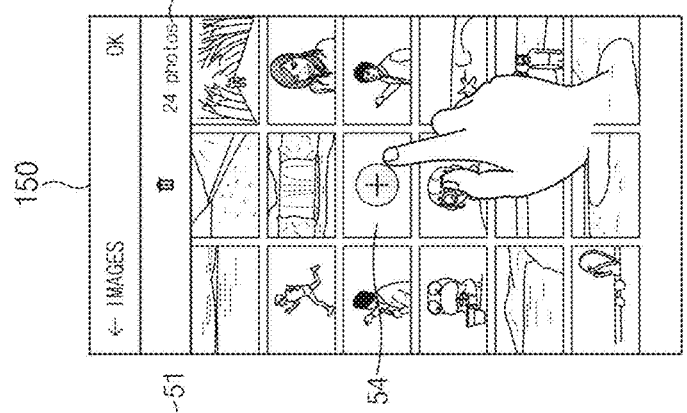
FIG. 8C
FIG. 8D

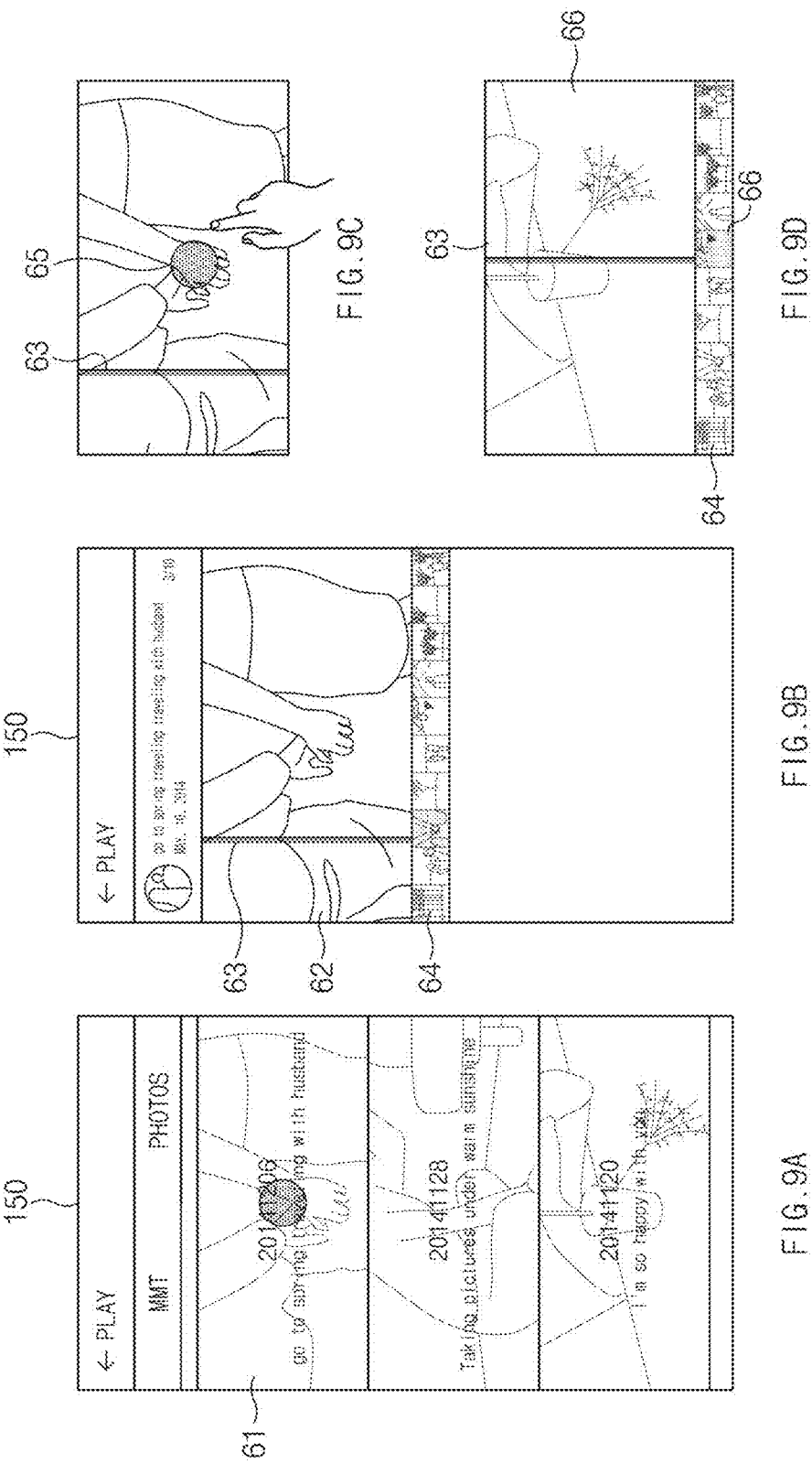

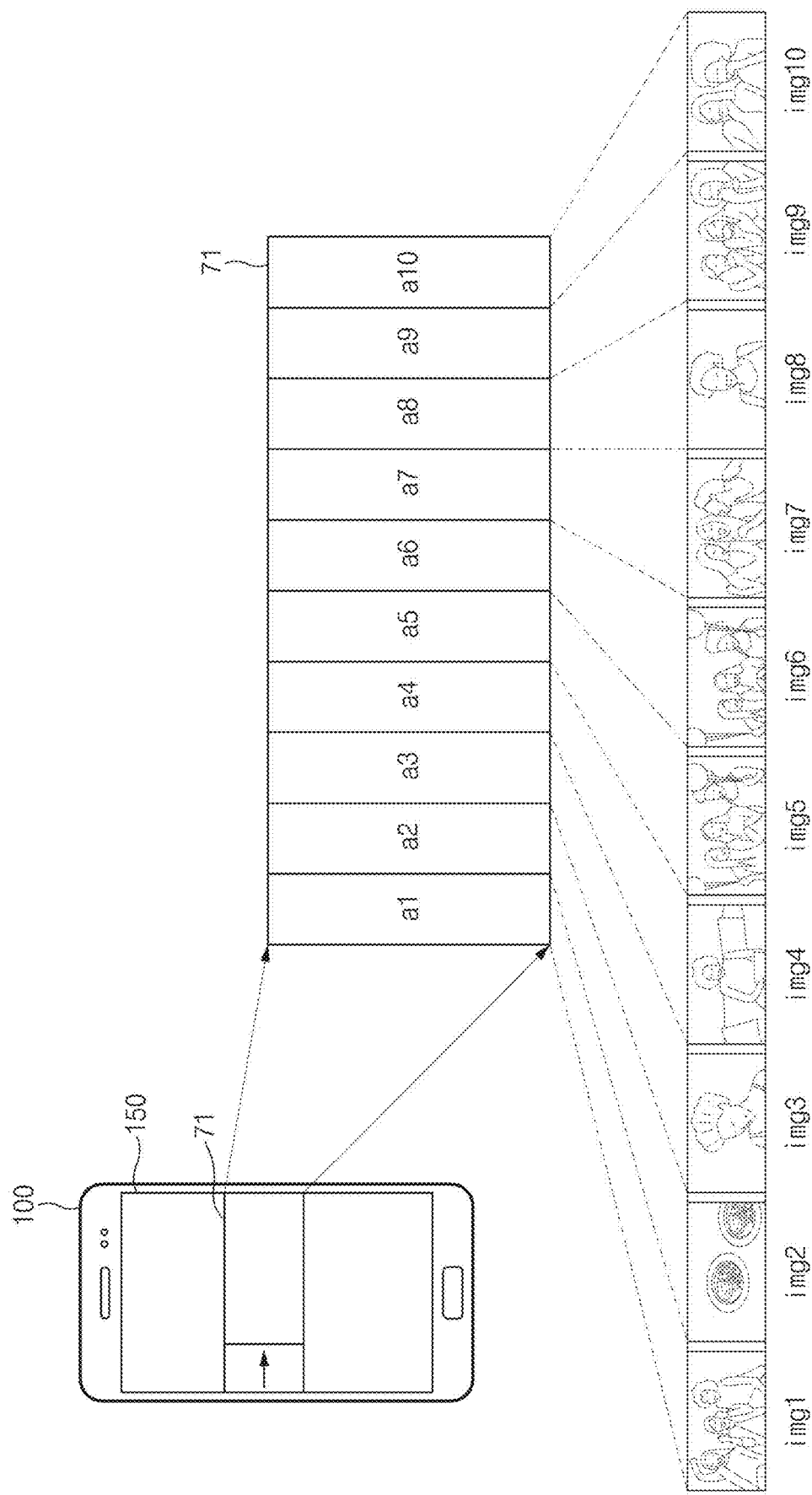

ELECTRONIC DEVICE AND METHOD FOR GENERATING IMAGE FILE IN ELECTRONIC DEVICE

CROSS-REFERENCE TO RELATED APPLICATION(S)

This application claims the benefit under 35 U.S.C. § 119(a) of a Korean patent application filed on Jun. 2, 2015 in the Korean Intellectual Property Office and assigned Serial number 10-2015-0078156, the entire disclosure of which is hereby incorporated by reference.

TECHNICAL FIELD

The present disclosure relates to methods for generating image files using images stored in electronic devices.

BACKGROUND

People capture photos to share memories such as travels and anniversaries. When a camera is mounted on a portable terminal such as a smartphone or a tablet personal computer (PC), it becomes the norm to capture and share photos in people's daily lives.

In general, photos may be stored in a plurality of folders in an electronic device. Photos stored in each folder may be displayed in the form of thumbnails on one screen, or one photo selected by a user of the electronic device may be displayed.

Due to characteristics of a digital device which easily capture and delete images, the number of times photos are captured has greatly increased. With the advancement of communication technologies and social networking services (SNSs), sharing images of events captured by people, such as travels, with other people over the Internet has also greatly increased. However, as the quantity of photos has increased, they are not managed easily. The user is required to select photos to be sent one by one to send the photos stored in the electronic device to another electronic device. Also, as the size of data of each of photos is increased, if the user sends or uploads a plurality of photos, a communication fee may strain the user's finances.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are provided to address at least the above-mentioned problems and/or disadvantages, and to provide at least the advantages described below. Accordingly, an aspect of the present disclosure is to provide an electronic device for easily playing, managing, and sharing an image by generating one image file by combining a plurality of photos, and a method for generating an image file in the electronic device.

In accordance with an aspect of the present disclosure, an electronic device is provided. The electronic device includes a memory to store a plurality of images which are discontinuously captured and a processor to select at least some of the plurality of images, generate an image combination file in a format for sequentially playing the selected images by combining the selected images, and store the image combination file in the memory.

In accordance with another aspect of the present disclosure, a method for generating an image file in an electronic device is provided. The method includes selecting at least some of a plurality of images which are discontinuously captured in a discontinuous way and are stored in a memory, generating an image combination file in a format for sequentially playing the selected images by combining the selected images, and storing the image combination file in the memory.

In accordance with another aspect of the present disclosure, a computer-readable recording medium is provided. The computer-readable recording medium includes a program for executing a method of selecting at least some of a plurality of images which are discontinuously captured and are stored in a memory, generating an image combination file in a format for sequentially playing the selected images by combining the selected images, and storing the image combination file in the memory.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 3A to 3F are drawings illustrating a user interface for setting an image selection condition according to various embodiments of the present disclosure;

FIGS. 4A to 4C are drawings illustrating a user interface for editing an image combination file according to various embodiments of the present disclosure;

FIGS. 5A to 5C are drawings illustrating a user interface for generating an image combination file according to various embodiments of the present disclosure;

FIGS. 7A to 7D are drawings illustrating a user interface for editing an image combination file according to various embodiments of the present disclosure;

FIGS. 8A to 8D are drawings illustrating a user interface for editing an image combination file according to various embodiments of the present disclosure;

FIGS. 9A to 9D are drawings illustrating a user interface for playing an image combination file according to various embodiments of the present disclosure;

FIG. 10 is a drawing illustrating an operation of playing an image combination file according to various embodiments of the present disclosure;

Throughout the drawings, it should be noted that like reference numbers are used to depict the same or similar elements, features, and structures.

DETAILED DESCRIPTION

Figure 1:
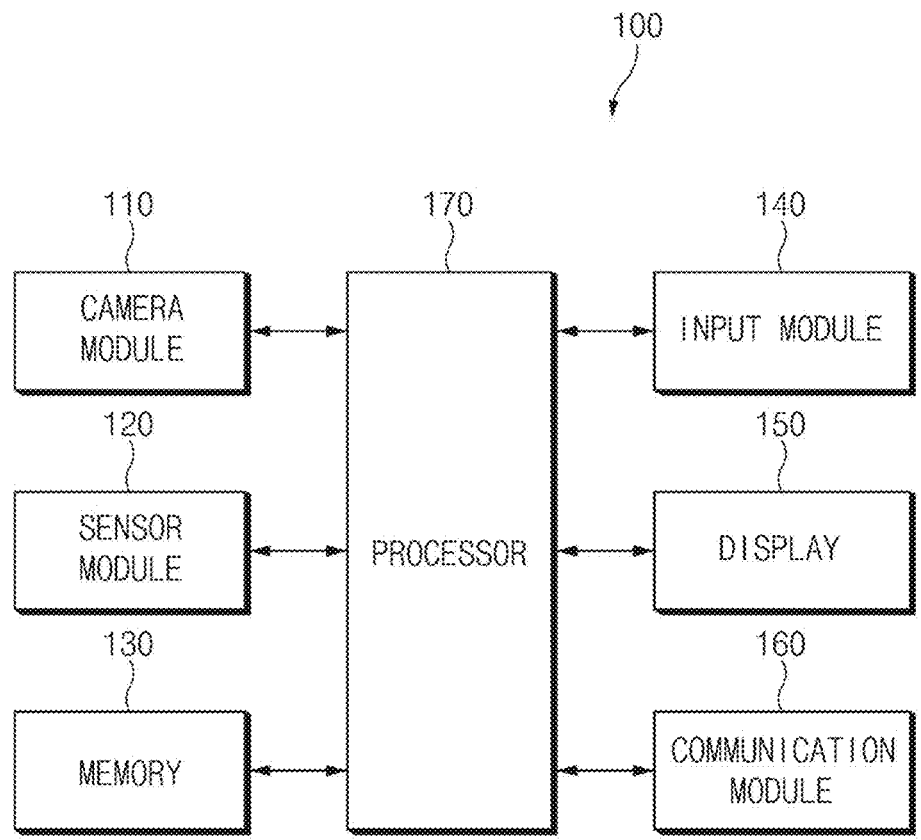
FIG. 1 is a block diagram illustrating a configuration of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

In the disclosure, the expressions "have", "may have", "include" and "comprise", or "may include" and "may comprise" used herein indicate the existence of corresponding features (e.g., elements such as numeric values, functions, operations, or components) but do not exclude the presence of additional features.

In the disclosure, the expressions "A or B", "at least one of A or/and B", "one or more of A or/and B", and the like used herein, may include any and all combinations of one or more of the associated listed items. For example, the term "A or B", "at least one of A and B", or "at least one of A or B", may refer to all of the case (1) where at least one A is included, the case (2) where at least one B is included, or the case (3) where both of at least one A and at least one B are included.

The expressions such as "1st", "2nd", "first", "second", and the like used in various embodiments of the present disclosure, may refer to various elements irrespective of the order and/or priority of the corresponding elements, and do not limit the corresponding elements. The expressions may be used to distinguish one element from another element. For instance, both "a first user device" and "a second user device" indicate user devices different from each other, irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), the element can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element).

Depending on the situation, the expression "configured to" used herein may be used as, for example, the expression "suitable for", "having the capacity to", "designed to", "adapted to", "made to", or "capable of". The term "configured to" does not mean only "specifically designed to" via hardware. Instead, the expression "a device configured to" may mean that the device is "capable of" operating together with another device or other components. For example, a "processor configured to perform A, B, and C" may mean a generic-purpose processor (e.g., a central processing unit (CPU) or an application processor (AP)) which may perform corresponding operations by executing one or more software programs which store a dedicated processor (e.g., an embedded processor) for performing a corresponding operation.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art, and not in an idealized or overly formal detect unless expressly so defined herein. In some cases, even if terms are defined in the specification, they may not be interpreted to exclude embodiments of the present disclosure.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMP's), Motion Picture Experts Group phase 1 or phase 2 (MPEG-1 or MPEG-2) audio layer 3 (MP3) players, mobile medical devices, cameras, or wearable devices. According to various embodiments, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

In various embodiments, the electronic devices may also be smart home appliances. The smart home appliances may include at least one of, for example, televisions (TVs), digital versatile disc (DVD) players, audio players, refrigerators, air conditioners, various cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

In various embodiments, the electronic devices may also include at least one of various medical devices (e.g., various portable medical measurement devices (e.g., blood glucose meters, heart rate meters, blood pressure meters, thermometers, and the like), a magnetic resonance angiography (MRA), a magnetic resonance imaging (MRI), a computed tomography (CT), scanners, ultrasonic devices, and the like), navigation devices, global navigation satellite systems (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may also include at least one of parts of furniture or buildings/structures, electronic boards, electronic signature receiving devices, projectors, or various measuring instruments (e.g., water meters, electricity meters, gas meters, wave meters, and the like). The electronic devices according to various embodiments of the present disclosure may also be one or more combinations of the above-mentioned devices. The electronic devices according to various embodiments of the present disclosure may be flexible or contoured electronic devices. However, electronic devices according to various embodiments of the present disclosure are not limited to the above-mentioned devices, and may include new electronic devices resulting from technology development.

Hereinafter, electronic devices according to various embodiments will be described with reference to the accompanying drawings. The term "user" used herein may refer to a person who uses an electronic device or may refer to a device (e.g., an artificial electronic device) that uses an electronic device.

FIG. 1 is a block diagram illustrating a configuration of an electronic device according to various embodiments of the present disclosure.

Referring to FIG. 1, an electronic device 100 may include a camera module 110, a sensor module 120, a memory 130, an input module 140, a display 150, a communication module 160, and a processor 170.

The camera module 100 may capture an image (or a photo). For example, the camera module 100 may generate an image file by capturing an image based on a user instruction.

The sensor module 120 may sense a state of the electronic device 100. According to an embodiment of the present disclosure, the sensor module 120 may include a time sensor (not shown). The time sensor may obtain information about a current time (including a year, a month, and a date) by constantly updating time. According to an embodiment of the present disclosure, if the camera module 110 captures an image, the time sensor may verify a time when the image is captured and may provide time information to the processor 170.

The memory 130 may store an image (or an image file) captured by the camera module 110. Alternatively, the memory 130 may store an image which is captured by an external device and is then sent from the external device. According to an embodiment of the present disclosure, the memory 130 may store a plurality of images captured in a discontinuous way. The discontinuous way may refer to, for example, a time or spatial discontinuous way. According to an embodiment of the present disclosure, the memory 130 may store a plurality of images captured at different times and/or in different places. The memory 130 may store a plurality of images captured at different times in a time discontinuous way. The memory 130 may store a plurality of images captured at different places in a spatial discontinuous way. For example, photos captured by a user of the electronic device 100 may correspond to a plurality of images captured in the discontinuous way. In contrast, moving images captured by the user may correspond to a plurality of images captured in a continuous way.

According to an embodiment of the present disclosure, the memory 130 may store an image combination file generated by combining the plurality of images captured in the discontinuous way. The image combination file may be an image file in a format for sequentially (or continuously) playing a plurality of images included in the image file.

The input module 140 may receive various user instructions. According to an embodiment of the present disclosure, the input module 140 may include a touch sensor panel for sensing a touch operation of the user or a pen sensor panel for sensing a pen operation of the user.

According to an embodiment of the present disclosure, the input module 140 may detect a user operation, which is not in direct contact with a panel (e.g., the touch sensor panel or the pen sensor panel) and is input from less than a specific distance, as well as a user operation which is in direct contact with the panel.

According to an embodiment of the present disclosure, the input module 140 may also receive a user instruction to select an image to be included in an image combination file.

According to an embodiment of the present disclosure, the input module 140 may receive a user instruction to set a selection condition of an image included in an image combination file.

According to an embodiment of the present disclosure, the input module 140 may also receive a user instruction to add a new image to an image combination file. According to an embodiment of the present disclosure, the input module 140 may also receive a user instruction to delete some of the images included in an image combination file. According to an embodiment, the input module 140 may also receive a user instruction to change an order where images included in an image combination file are arranged.

The display 150 may display a user interface. For example, if a determined or predetermined event occurs in the electronic device 100, the display 150 may display a corresponding user interface. For example, the display 150 may display an application execution screen, a content play screen, a menu screen, a lock screen, a notification message, and the like.

According to an embodiment of the present disclosure, the display 150 may display a user interface for setting an image selection condition. The image selection condition may include, for example, at least one of a time, a place, a person, a tag, or an image pattern.

According to an embodiment of the present disclosure, the display 150 may display a user interface for editing an image combination file. The user may delete some of images included in the image combination file or may change an order where the images included in the image combination file are arranged, through the user interface. Also, the user may add a new image to the image combination file through the user interface.

According to an embodiment of the present disclosure, the display 150 may also display a play screen of an image combination file. For example, the display 150 may sequentially display a plurality of images, included in the image combination file, at determined or predetermined time intervals. According to an embodiment of the present disclosure, the display 150 may display an image, corresponding to a region where a user operation is input, among the plurality of images included in the image combination file.

According to an embodiment of the present disclosure, the input module 140 and the display 150 may be implemented with, for example, a touch screen in which a touch sensor panel is disposed on a display panel, for simultaneously displaying an image and detecting a touch operation.

The communication module 160 may communicate data through a network (e.g., a mobile communication network or an internet network). According to an embodiment of the present disclosure, the communication module 160 may include a cellular module (not shown), a Wi-Fi module (not shown), a Bluetooth (BT) module (not shown), a near field communication (NFC) module (not shown), a GNSS module (not shown), and the like.

According to an embodiment of the present disclosure, the cellular module may communicate with a base station which provides a mobile communication service to an area where the electronic device 100 is located. According to an embodiment, the cellular module may send information associated with a serving cell to the processor 170.

According to an embodiment of the present disclosure, the Wi-Fi module may communicate with an access point (AP) which provides a wireless internet service within a determined or predetermined range. According to an embodiment of the present disclosure, the Wi-Fi module may obtain information about an AP (e.g., a position of the AP, an identification number of the AP, and the like) which currently communicates with the electronic device 100.

According to an embodiment of the present disclosure, the GNSS module may determine a current position (e.g., latitude/longitude) of the electronic device 100 using information received from a satellite. According to an embodiment of the present disclosure, if the camera module 110 captures an image, the GNSS module may verify a position where the image is captured and may provide the verified position to the processor 170.

According to an embodiment of the present disclosure, the communication module 160 may communicate with an external device to communicate an image or an image combination file with the external device. For example, the communication module 160 may send an image combination file to a social networking service (SNS) server or receive an image combination file from an SNS server.

The processor 170 may control overall operations of the electronic device 100. According to an embodiment of the present disclosure, the processor 170 may control the camera module 110, the sensor module 120, the memory 130, the input module 140, the display 150, and the communication module 160 to generate, manage, and play an image combination file according to various embodiments of the present disclosure.

According to an embodiment of the present disclosure, the processor 170 may execute an application for generating, managing, and playing an image combination file, and may provide an image combination file service to the user. According to an embodiment of the present disclosure, the processor 170 may be implemented with a system on chip (SoC).

According to an embodiment of the present disclosure, the processor 170 may store an image captured by the camera module 110 in the memory 130. According to an embodiment of the present disclosure, the processor 170 may also generate metadata associated with an image captured by the camera module 110, and may store the generated metadata together with the image in the memory 130. The metadata may include, for example, information such as a time when the image is captured, a place where the image is captured, a person included in the image, and a tag inserted into the image (e.g., a time, a place, a person, feelings of the user, an event (e.g., a holiday, a birthday, a travel location, and the like) associated with the image). According to an embodiment of the present disclosure, the time or place information may be received from the sensor module 120 (e.g., the time sensor) or the communication module 160 (e.g., the GNSS module).

According to an embodiment, the person information included in the image may be generated to identify a person included in the image through a face recognition algorithm, or may be received from the user. According to an embodiment of the present disclosure, the feelings of the user or the event associated with the image may also be received from the user. The metadata may be communicated together with the image. For example, if the electronic device 100 receives an image captured by an external device, metadata may be included in the received image.

According to an embodiment of the present disclosure, the processor 170 may select at least some of a plurality of images stored in the memory 130. For example, the processor 170 may select a plurality of images stored in the memory 130.

According to an embodiment of the present disclosure, the processor 170 may select an image selected by the user. For example, the processor 170 may display a user interface for selecting at least some of a plurality of images, on the display 150. The user may select at least some of a plurality of images stored in the memory 130 through the user interface displayed on the display 150.

According to an embodiment of the present disclosure, the processor 170 may also select at least some of the plurality of images stored in the memory 130 using metadata. According to an embodiment of the present disclosure, the processor 170 may select at least some of the plurality of images stored in the memory 130 based on an image selection condition set by the user. For example, the processor 170 may display a user interface for setting an image selection condition, on the display 150. The user may set an image selection condition through the user interface displayed on the display 150. The user may then select at least some of images. The image selection condition may include, for example, at least one of a time when an image is captured, a place where the image is captured, a person included in the image, a tag inserted into the image, or an image pattern.

According to an embodiment of the present disclosure, the processor 170 may generate an image combination file by combining selected images. According to an embodiment of the present disclosure, the processor 170 may compress selected images and may generate an image combination file by combining the compressed images. Therefore, if the image combination file includes many images, the processor 170 may reduce a data size of the image combination file to easily play and share the image combination file.

According to an embodiment of the present disclosure, the processor 170 may arrange selected images based on at least one of a time when each of the images is captured, a place where each of the images is captured, a person included in each of the images, a tag inserted into each of the images, or an image pattern, and may generate an image combination file by combining the selected images in the arranged order.

According to an embodiment of the present disclosure, the processor 170 may store the generated image combination file in the memory 130. According to an embodiment of the present disclosure, the processor 170 may generate metadata associated with the image combination file, and may store the generated metadata together with the image combination file in the memory 130. The metadata may include, for example, information such as a time when an image included in the image combination file is captured, a place where the image is captured, a person included in the image, and a tag inserted into the image (e.g., a time, a place, a person, feelings of the user, an event (e.g., a holiday, a birthday, a travel location, and the like) associated with the image). The metadata of the image combination file may be generated based on metadata of an image included in the image combination file or may be received from the user.

According to an embodiment of the present disclosure, the processor 170 may also edit the image combination file. For one example, the processor 170 may delete some of images included in the image combination file based on a user instruction. For another example, the processor 170 may change an order where images included in the image combination file are arranged, based on a user instruction. For another example, the processor 170 may add a new image to the image combination file based on a user instruction.

According to an embodiment of the present disclosure, the processor 170 may also send the image combination file to an external device through the communication module 160. For example, the processor 170 may share the image combination file by uploading the image combination file into a short message service (SMS) server or sending the image combination file to an electronic device of another user based on a user instruction.

According to an embodiment of the present disclosure, the processor 170 may play and display the image combination file on the display 150. According to an embodiment of the present disclosure, the processor 170 may play and display the image combination file on at least part of the display 150 based on a user instruction.

According to an embodiment of the present disclosure, if the image combination file is played, the processor 170 may sequentially display a plurality of images included in the image combination file at determined or predetermined time intervals on the display 150.

According to an embodiment of the present disclosure, if the image combination file is played, the processor 170 may divide a region where the image combination file is displayed into a plurality of regions corresponding to the number of images included in the image combination file. According to an embodiment of the present disclosure, if a user operation is input on a region on which the image combination file is displayed, the processor 170 may display an image corresponding to the region on which the user operation is input, on the display 150.

Figure 2C:
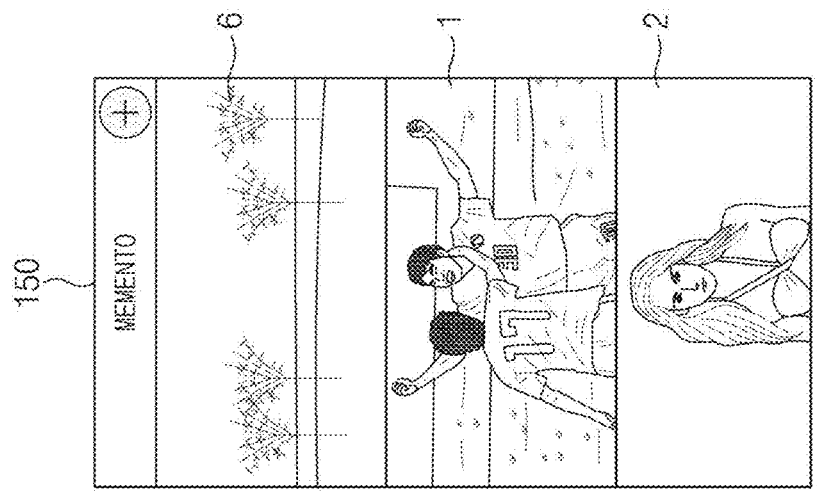
FIGS. 2A to 2C are drawings illustrating a user interface for generating an image combination file according to various embodiments of the present disclosure.
Figure 2B:
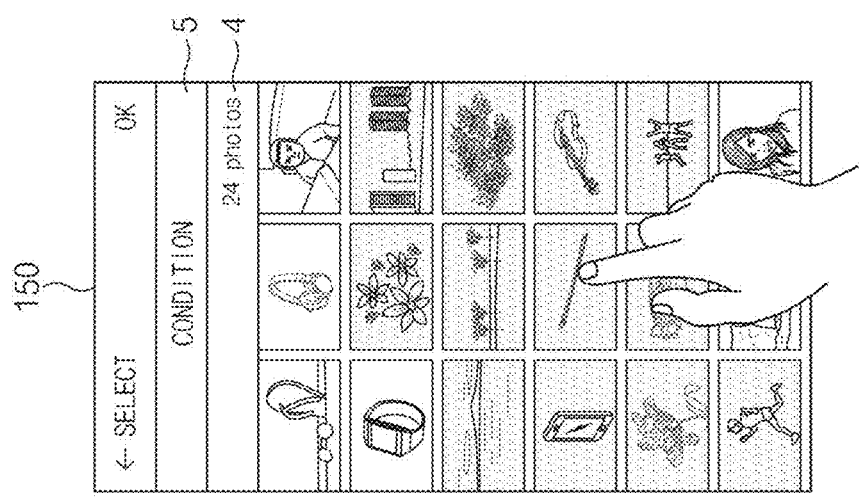
Figure 2A:
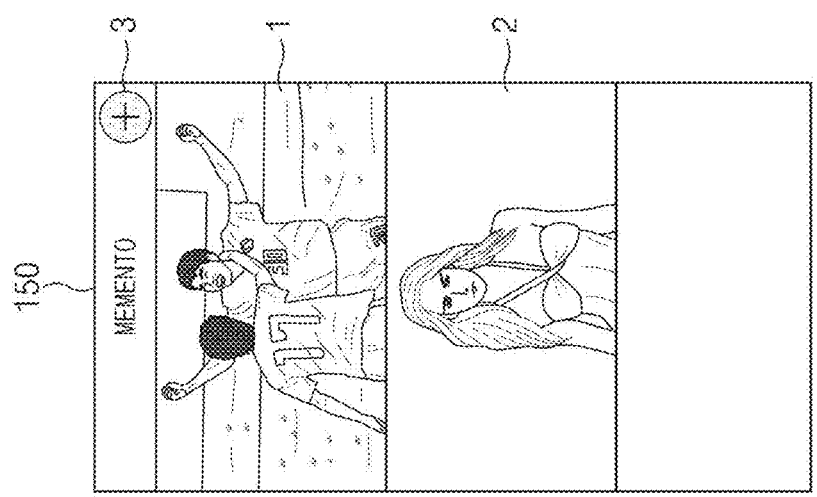

FIGS. 2A to 2C are drawings illustrating a user interface for generating an image combination file according to various embodiments of the present disclosure.

Referring to FIG. 2A, a display 150 may display image combination files 1 and 2 stored in a memory 130 of FIG. 1. For example, the display 150 may display the image combination files stored in the memory 130 arranged in an order reflecting the time when each image combination file was generated. According to an embodiment of the present disclosure, the display 150 may display a single image which represents each of the image combination files 1 and 2, among a plurality of images included in each of the image combination files 1 and 2. According to an embodiment of the present disclosure, the display 150 may display an object 3 for generating a new or modified image combination file.

For example, referring to FIG. 2A, the display 150 may display the icon object 3 of a plus shape.

Referring to FIG. 2B, if a user of an electronic device 100 of FIG. 1 selects the icon object 3, the display 150 may display a plurality of images stored in the memory 130. The user may select at least some of the plurality of images displayed on the display 150. For example, the user may touch a specific image displayed on the display 150 to select the specific image. According to an embodiment of the present disclosure, the display 150 may display the image selected by the user using a color, shading, or brightness different from that of an image which is not selected by the user. According to an embodiment, the display 150 may display an object 4 indicating the number of selected images. For example, referring to FIG. 2B, the display 150 may display a text object 4 indicating the number of selected images.

According to an embodiment of the present disclosure, the display 150 may also display an object 5 which may enter a menu for setting an image selection condition. If the user selects the condition setting object 5, the display 150 may display a user interface shown in FIG. 3A. In this regard, a description will be given of the user interface with reference to FIGS. 3A to 3C.

When the selection of the images is completed, the processor 170 may generate an image combination file by combining the selected images and may store the generated image combination file in the memory 130. Referring to FIG. 2C, the display 150 may display a newly generated image combination file 6 in addition to the previously stored image combination files 1 and 2.

FIGS. 3A to 3F are drawings illustrating a user interface for setting an image selection condition according to various embodiments of the present disclosure.

If a user of an electronic device 100 of FIG. 1 selects a condition setting object 5 shown in FIG. 2B, a display 150 may display a user interface shown in FIG. 3A.

Referring to FIG. 3A, the display 150 may display a menu for setting a time 11 when an image is captured, a menu for setting a place 13 where the image is captured, a menu for setting a person 15 included in the image, a menu for setting a tag 17 inserted into the image, and a menu for setting an image pattern 19. Each of the menus may include an object 20 for selecting a condition ON/OFF state. According to an embodiment of the present disclosure, if the object 20 is in an 'ON' state, a processor 170 of FIG. 1 may select an image in consideration of the corresponding condition. If the object 20 is in an 'OFF' state, the processor 170 may select an image without considering the corresponding condition. For example, referring to FIG. 3A, the processor 170 may select the image in consideration of the time 11 when the image is captured and the place 13 where the image is captured.

According to an embodiment of the present disclosure, if the user selects a specific condition, the display 150 may display a user interface for setting details of the selected condition.

According to an embodiment of the present disclosure, if the user selects the menu for setting the time 11 when the image is captured on the user interface shown in FIG. 3A, the display 150 may display a user interface shown in FIG. 3B.

Referring to FIG. 3B, the display 150 may display an object for setting a start time 21 and an object for setting an end time 22. If the user sets a start time and an end time, the processor 170 may select images captured between the set times.

According to an embodiment of the present disclosure, if the user selects the menu for setting the place 13 where the image is captured on the user interface shown in FIG. 3A, the display 150 may display a user interface shown in FIG. 3C.

Referring to FIG. 3C, the display 150 may display a search window 23 for searching for an area or place. The user may search for an area or place using the search window 23 and may set the place 13 where the image is captured. If the user sets the place where the image is captured, the processor 170 may select an image captured in the set place.

The display 150 may also display an object 24 for setting a range and a map 25 for setting a position. If the user sets a position and a range, the processor 170 may select an image captured within the set range.

According to an embodiment of the present disclosure, if the user selects the menu for setting the person 15 included in the image on the user interface shown in FIG. 3A, the display 150 may display a user interface shown in FIG. 3D.

Referring to FIG. 3D, the display 150 may arrange and display images stored in the memory 130. The user may select an image displayed on the display 150 or a specific person (or specific persons) included in the image. If the user selects a person (or a landmark), the processor 170 may recognize a face of the selected person (or a shape of the selected landmark) using a face recognition algorithm (or a landmark recognition algorithm) and may select an image including the corresponding face (or the corresponding landmark).

According to an embodiment of the present disclosure, if the user selects the menu for setting the tag 17 inserted into the image on the user interface shown in FIG. 3A, the display 150 may display a user interface shown in FIG. 3E.

Referring to FIG. 3E, the display 150 may display a search window 26 for searching for a tag inserted into the image. The user may set a tag using the search window 26.

The display 150 may also display a list of tags 27 inserted into an image stored in the memory 130. The user may select at least one of the tags included in the tag list and may set the tag. If the user sets the tag, the processor 170 may select an image into which the set tag is inserted.

According to an embodiment of the present disclosure, if the user selects the menu for setting the image pattern 19 on the user interface shown in FIG. 3A, the display 150 may display a user interface shown in FIG. 3F.

Referring to FIG. 3F, the display 150 may arrange and display images stored in the memory 130. The user may select at least one of the images displayed on the display 150. If the image is selected, the processor 170 may analyze a pattern of the image using an image pattern analysis algorithm and may select an image having a pattern similar to the analyzed pattern.

Although not illustrated in FIGS. 3A to 3F, the display 150 may also display a calendar including schedule information. If the user selects a specific schedule, the processor 170 may select an image captured between times corresponding to the corresponding schedule or an image captured in a place corresponding to the corresponding schedule.

FIGS. 4A to 4C are drawings illustrating a user interface for editing an image combination file according to various embodiments of the present disclosure.

Referring to FIG. 4A, a display 150 of FIG. 1 may arrange and display a plurality of images included in an image combination file. According to an embodiment of the present disclosure, a user interface displayed on the display 150 may include a deletion region 31 for deleting an image included in the image combination file.

According to an embodiment of the present disclosure, the display 150 may also display an object 32 indicating the number of the images included in the image combination file.

Referring to FIG. 4B, a user of an electronic device 100 of FIG. 1 may select an image 33 displayed on the display 150 and may move the selected image 33 to the deletion region 31. If the image 33 is moved to the deletion region 31, a processor 170 of FIG. 1 may delete the corresponding image from the image combination file.

Referring to FIG. 4C, the display 150 may arrange and display the remaining images except for the deleted image. Also, the display 150 may correct the object 32 indicating the number of the images and may display the corrected object 32.

FIGS. 5A to 5C are drawings illustrating a user interface for generating an image combination file according to various embodiments of the present disclosure.

Referring to FIG. 5A, a display 150 of FIG. 1 may arrange and display a plurality of images included in an image combination file. A user of an electronic device 100 of FIG. 1 may select an image 35 displayed on the display 150 and may change positions of the images (or an order where the images are arranged).

For example, referring to FIG. 5B, the user may select the image 35 displayed on the display 150 and may move the selected image 35 between a $5^{th}$ image 36 and a $6^{th}$ image 37. According to an embodiment, when the movement of the image is completed, the processor 170 may rearrange the images included in the image combination file.

Referring to FIG. 5C, the display 150 may display the rearranged images. For example, the display 150 may arrange and display the moved image 35 between the $5^{th}$ image 36 and the $6^{th}$ image 37.

In FIGS. 4A to 4C and FIGS. 5A to 5C, an embodiment of the present disclosure is exemplified as the user deletes or moves only one image included in the image combination file. However, the scope and spirit of the present disclosure may not be limited thereto. For example, the user may simultaneously select a plurality of images included in the image combination file and may delete or move the plurality of images. An operation of simultaneously selecting a plurality of images included in the image combination file will be described with reference to FIGS. 7A to 7D.

Figure 6C:
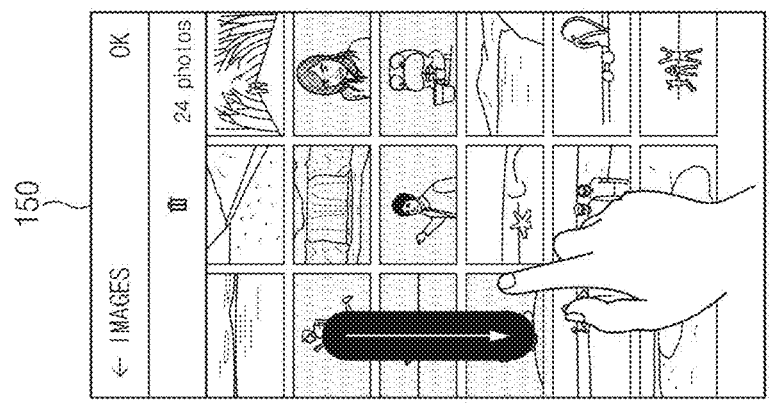
FIGS. 6A to 6C are drawings illustrating a user interface for selecting a plurality of images according to various embodiments of the present disclosure.
Figure 6B:
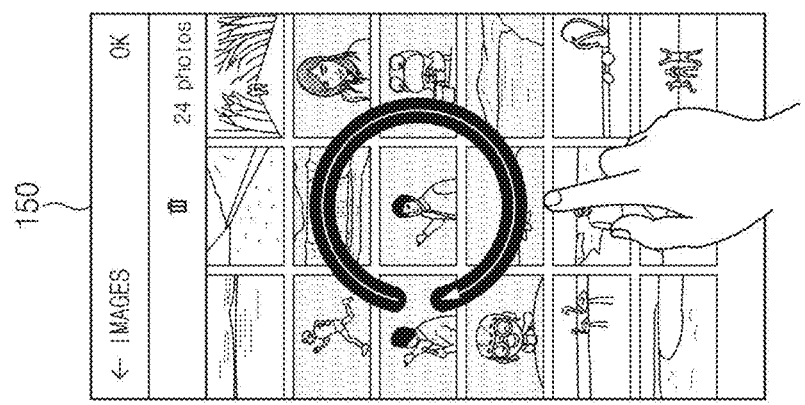
Figure 6A:
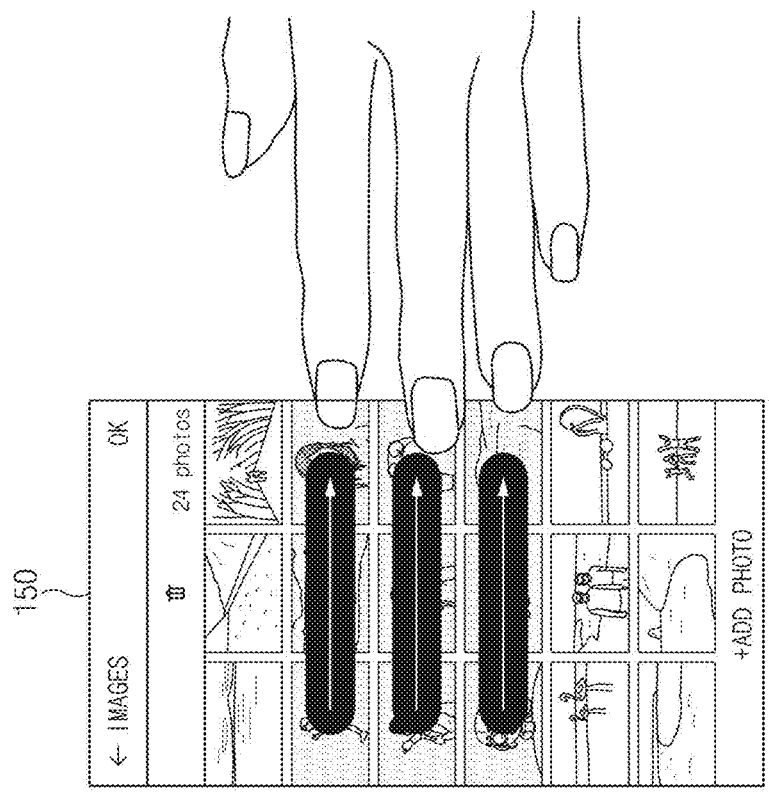

FIGS. 6A to 6C are drawings illustrating a user interface for selecting a plurality of images according to various embodiments of the present disclosure.

Referring to FIG. 6A, a display 150 of FIG. 1 may arrange and display a plurality of images included in an image combination file. A user of an electronic device 100 of FIG. 1 may input a swipe operation of a transverse direction which passes through a plurality of images to select the plurality of images. For example, the user may input a swipe operation using a plurality of his or her fingers (e.g., two or three fingers). A processor 170 of FIG. 1 may then select a plurality of images displayed on a region where the swipe operation is input.

Referring to FIG. 6B, the user may input a touch operation of a figure form to select a plurality of images. For example, the user may input a touch operation of a circle or oval. The processor 170 may then select images which are included in the circle or oval or pass through the circle or oval.

Referring to FIG. 6C, the user may input a swipe operation of a longitudinal or diagonal direction which passes through a plurality of images to select the plurality of images. If the swipe operation of the longitudinal or diagonal direction is input, the processor 170 may then select images included between an image corresponding to a start point of the swipe operation and an image corresponding to an end point of the swipe operation.

FIGS. 7A to 7D are drawings illustrating a user interface for editing an image combination file according to various embodiments of the present disclosure.

Referring to FIG. 7A, a display 150 of FIG. 1 may arrange and display a plurality of images included in an image combination file. According to an embodiment of the present disclosure, the display 150 may display an object 41 indicating the number of the images included in the image combination file. A user of an electronic device 100 of FIG. 1 may input a plurality of swipe operations which are directed toward opposite sides from a boundary of successive images 42 and 43 to add a new image between the arranged images 42 and 43.

Referring to FIG. 7B, a processor 170 of FIG. 1 may generate a new blank region 44 between the two images 42 and 43 on which the swipe operations are input. If the user selects the blank region 44, the display 150 may display a user interface shown in FIG. 7C.

Referring to FIG. 7C, the display 150 may arrange and display images stored in a memory 130 of FIG. 1. According to an embodiment of the present disclosure, the processor 170 may exclude images, included in an image combination file being executed from the images stored in the memory 130. The user may select at least some 45 of images displayed on the display 150. For example, the user may select each of images displayed on the display 150 or, as described with reference to FIGS. 6A to 6C, may simultaneously select a plurality of images using one operation. According to an embodiment, the display 150 may also display an object 46 indicating the number of the selected images. When the selection of the images is completed, the processor 170 may add newly selected images to the image combination file. For example, the processor 170 may compress the selected images and may add the compressed images to the image combination file.

Referring to FIG. 7D, the display 150 may arrange and display the newly added images 45 at the region 44. Also, the display 150 may correct the object 41 indicating the number of the images and may display the corrected object 41.

FIGS. 8A to 8D are drawings illustrating a user interface for editing an image combination file according to various embodiments of the present disclosure.

Referring to FIG. 8A, a display 150 of FIG. 1 may arrange and display a plurality of images included in an image combination file. According to an embodiment of the present disclosure, the display 150 may display an object 51 indicating the number of the images included in the image combination file. A user of an electronic device 100 of FIG. 1 may input a plurality of swipe operations which are directed toward opposite directions from a boundary of successive images 52 and 53 to add a new image between the arranged images 52 and 53.

Referring to FIG. 8B, a processor 170 of FIG. 1 may generate a new blank region 54 between the two images on which the swipe operations are input. If the user selects the blank region 54, the display 150 may display a user interface shown in FIG. 8C.

Referring to FIG. 8C, the display 150 may arrange and display image combination files stored in a memory 130 of FIG. 1. According to an embodiment of the present disclosure, the processor 170 may exclude an image combination file being executed from the image combination files stored in the memory 130. The user may select at least one 55 of image combination files displayed on the display 150. The selected image combination file 55 may include images 57. If the image combination file 55 is selected, the processor 170 may add images 57 to the selected image combination file.

Referring to FIG. 8D, the display 150 may arrange and display newly added images 57 at the region 54. Also, the display 150 may correct the object 51 indicating the number of images and may display the corrected object 51.

FIGS. 9A to 9D are drawings illustrating a user interface for playing an image combination file according to various embodiments of the present disclosure.

Referring to FIG. 9A, a display 150 of FIG. 1 may arrange and display image combination files stored in a memory 130 of FIG. 1. According to an embodiment of the present disclosure, the display 150 may display metadata (e.g., a date when an image is capture or a tag inserted into an image combination file), associated with the image combination file, together with the image combination files. If a user of an electronic device 100 of FIG. 1 selects one 61 of image combination files displayed on the display 150, a processor 170 of FIG. 1 may play the selected image combination file.

Referring to FIG. 9B, the display 150 may display the played image combination file 61. For example, the display 150 may sequentially display images, included in the image combination file 61, at determined or predetermined time intervals (e.g., one second) on a determined or predetermined region 62 (e.g., at least part of the display 150).

According to an embodiment of the present disclosure, the display 150 may also display a status bar 63 indicating a playing state (order or time) of an image combination file. According to an embodiment of the present disclosure, the status bar 63 may be included in a region which displays an image.

According to an embodiment of the present disclosure, the display 150 may also display thumbnail images 64 of a plurality of images included in the image combination file 61. The thumbnail images 64 may be displayed on, for example, a lower end of a region which displays the image combination file 61.

According to an embodiment of the present disclosure, the status bar 63 may gradually move to the right based on the reproduction of the image combination file 61. According to an embodiment, an image displayed on the display 150 may be changed based on a position of the status bar 63. For example, the display 150 may display an image 66 corresponding to a current position of the status bar 63 among the thumbnail images 64.

Referring to FIG. 9C, the processor 170 may change an image displayed on the display 150 based on a user operation. If a user operation is input on a point 65 to the right of the status bar 63 while an image combination file is played as shown in FIG. 9D, the display 150 may display an image corresponding to the position 65 on which the user operation is input.

According to an embodiment of the present disclosure, the processor 170 may constantly change the image displayed on the display 150 based on position movement of a user operation. For example, the user may constantly search for a plurality of images included in the image combination file using one touch operation (e.g., touching to the left or right of the status bar 63, or dragging the status bar 63 to the left or right).

In FIGS. 9A to 9D, an embodiment of the present disclosure is exemplified as the display 150 displays the status bar 63 in the form of a line of crossing an image. However, the scope and spirit of the present disclosure may not be limited thereto. For example, the status bar 63 may be displayed in various ways and may indicate a playing state (order or time) of an image combination file. As another example, the status bar 63 may be displayed on one side of an image (e.g., a lower end of the image or a thumbnail image). As another example, the status bar 63 may be displayed as a highlight effect instead of a line form, or may be displayed in the form of an icon on a thumbnail image.

FIG. 10 is a drawing illustrating an operation of playing an image combination file according to various embodiments of the present disclosure.

Referring to FIG. 10, if a processor 170 of FIG. 1 plays an image combination file, a display 150 of FIG. 1 may display the image combination file on at least part 71 of the display 150.

According to an embodiment of the present disclosure, the processor 170 may divide the region 71 which displays the image combination file into a plurality of regions corresponding to the number of images included in the image combination file. For example, referring to FIG. 10, if 10 images img1 to img10 are included in the image combination file, the processor 170 may divide the region 71 which displays the image combination file into 10 regions a1 to a10. Each of the classified regions a1 to a10 may correspond to one of the plurality of images img1 to img10 included in the image combination file.

According to an embodiment of the present disclosure, a status bar (e.g., status bar 63 of FIG. 9B) displayed on a screen where the image combination file is played may be continuously moved from the region a1 to the region a10. The display 150 may display an image corresponding to a region which displays the status bar.

According to an embodiment of the present disclosure, if a user operation such as a touch or a touch and drag is input on the region 71 which displays the image combination file, the display 150 may display an image corresponding to the region 71 on which the user operation is input or an image corresponding to the input user operation. For example, if a user operation is input on the region a7 in a state where the display 150 displays the second image img2, the display 150 may change the second image img2 to the 7th image img7 and may display the 7th image img7.

Figure 11:
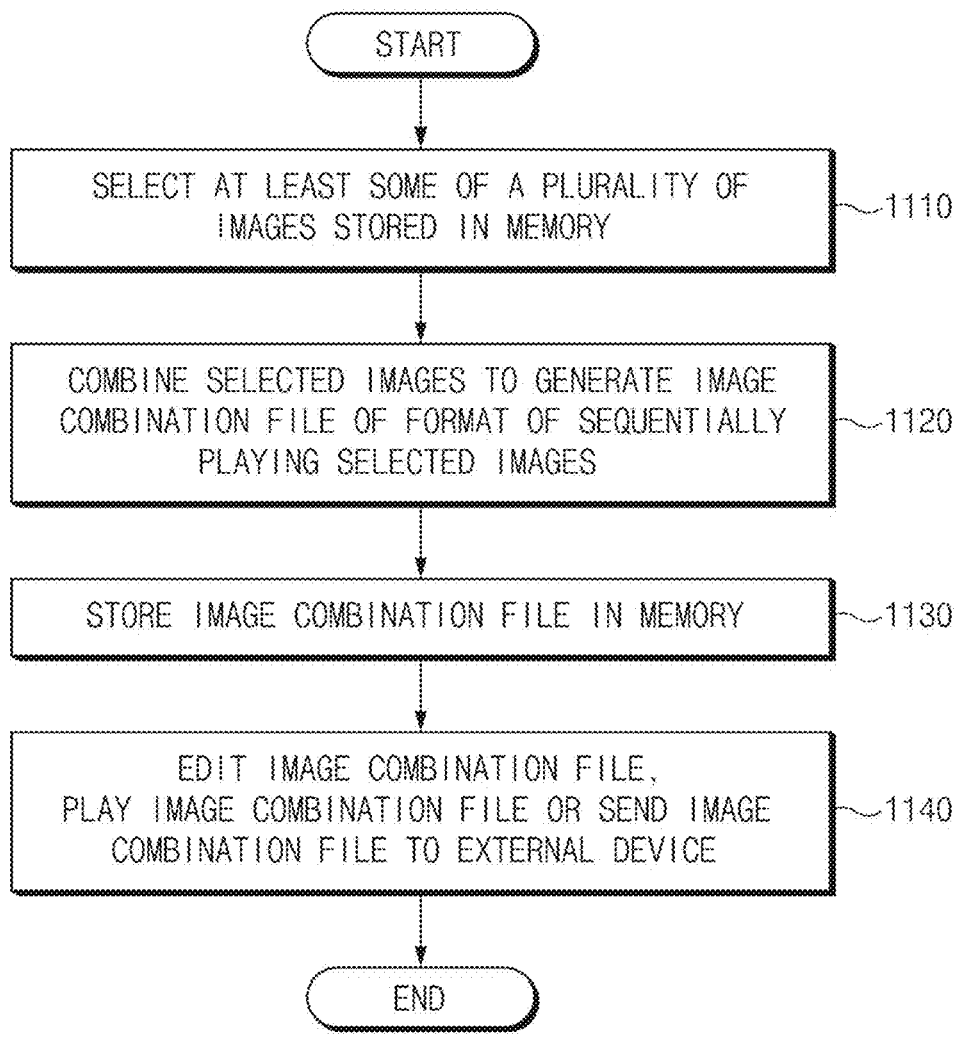
FIG. 11 is a flowchart illustrating a method for generating an image file in an electronic device according to various embodiments of the present disclosure.

FIG. 11 is a flowchart illustrating a method for generating an image file in an electronic device according to various embodiments of the present disclosure.

Referring to FIG. 11, in operation 1110, an electronic device 100 of FIG. 1 may select at least some of a plurality of images stored in a memory 130 of FIG. 1. According to an embodiment, the electronic device 100 may select an image selected by a user.

According to an embodiment of the present disclosure, the electronic device 100 may select at least some of the plurality of images stored in the memory 130 using metadata. For example, the electronic device 100 may select at least some of the plurality of images stored in the memory 130 based on an image selection condition set by the user.

According to an embodiment of the present disclosure, in operation 1120, the electronic device 100 may combine the selected images to generate an image combination file in a format for sequentially playing the selected images. According to an embodiment of the present disclosure, the electronic device 100 may compress the selected images and may generate an image combination file by combining the compressed images.

According to an embodiment of the present disclosure, the electronic device 100 may arrange the selected images based on at least one of a time when each of the images is captured, a place where each of the images is captured, a person included in each of the images, a tag inserted into each of the images, or an image pattern, and may generate an image combination file by combining the selected images in the arranged order.

According to an embodiment of the present disclosure, in operation 1130, the electronic device 100 may store the image combination file in the memory 130. According to an embodiment of the present disclosure, the electronic device 100 may also generate metadata associated with the image combination file and store the generated metadata together with the image combination file in the memory 130. The metadata may include, for example, information such as a time when an image included in the image combination file is captured, a place where the image is captured, a person included in the image, and a tag inserted into the image (e.g., a time, a place, a person, feelings of the user, an event (e.g., a holiday, a birthday, a travel location, and the like) associated with the image).

According to an embodiment of the present disclosure, in operation 1140, the electronic device 100 may edit and play the image combination file or may send the image combination file to an external device.

According to an embodiment of the present disclosure, the electronic device 100 may also edit the image combination file. For one example, the electronic device 100 may delete some of images included in the image combination file based on a user instruction. As another example, the electronic device 100 may change an order where images included in the image combination file are arranged based on a user instruction. As another example, the electronic device 100 may add a new image to the image combination file based on a user instruction.

According to an embodiment of the present disclosure, the electronic device 100 may send the image combination file to an external device or elsewhere. For example, the electronic device 100 may upload the image combination file into an SMS server or send the image combination file to an electronic device of another user based on a user instruction to share the image combination file with the other user.

According to an embodiment of the present disclosure, the electronic device 100 may play and display the image combination file on a display 150 of FIG. 1. According to an embodiment, if the image combination file is played, the electronic device 100 may sequentially display a plurality of images included in the image combination file at determined or predetermined time intervals on the display 150.

According to an embodiment of the present disclosure, if the image combination file is played, the electronic device 100 may divide a region on which the image combination file is displayed into a plurality of regions corresponding to the number of images included in the image combination file.

According to an embodiment of the present disclosure, if a user operation is input on the region which displays the image combination file, the electronic device 100 may display an image corresponding to the region on which the user operation is input on the display 150.

Figure 12:
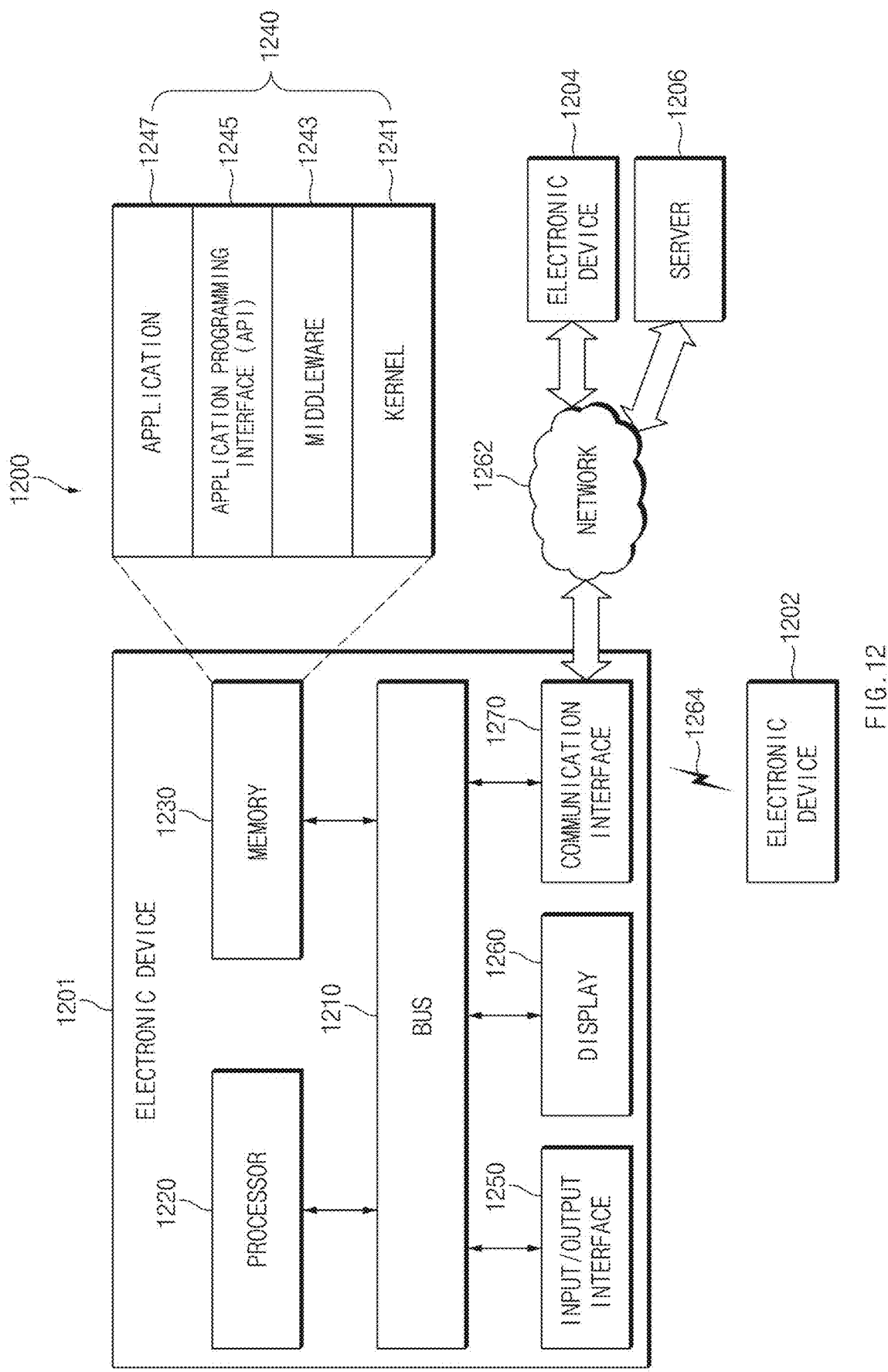
FIG. 12 is a block diagram illustrating a configuration of an electronic device in a network environment according to various embodiments of the present disclosure.

FIG. 12 is a block diagram illustrating a configuration of an electronic device in a network environment according to various embodiments of the present disclosure.

Referring to FIG. 12, a description will be given of an electronic device 1201 in a network environment 1200. The electronic device 1201 may include, for example, all or some of components of an electronic device 100 shown in FIG. 1. The electronic device 1201 may also include a bus 1210, a processor 1220, a memory 1230, an input and output interface 1250, a display 1260, and a communication interface 1270. In various embodiments, at least one of the components may be omitted from the electronic device 1201, and other components may be additionally included in the electronic device 1201.

The bus 1210 may be, for example, a circuit which connects the components 1220 to 1270 with each other and transmits communication signals (e.g., a control message and/or data) between the components.

The processor 1220 may include one or more of a CPU, an AP, or a communication processor (CP). For example, the processor 1220 may perform calculations or data processing regarding control and/or communications of at least one of the components of the electronic device 1201.

The memory 1230 may include a volatile and/or non-volatile memory. The memory 1230 may store, for example, instructions or data associated with at least one of the components of the electronic device 1201. According to an embodiment, the memory 1230 may also store software and/or programs 1240.

The programs 1240 may include, for example, a kernel 1241, a middleware 1243, an application programming interface (API) 1245, application programs 1247 (or an "application"), and the like. At least part of the kernel 1241, the middleware 1243, or the API 1245 may function as and be referred to as an operating system (OS).

The kernel 1241 may control or manage, for example, system resources (e.g., the bus 1210, the processor 1220, the memory 1230, and the like) used to execute an operation or function implemented in the other programs (e.g., the middleware 1243, the API 1245, or the application programs 1247). Also, as the middleware 1243, the API 1245, or the application programs 1247 access a separate component of the electronic device 1201, the kernel 1241 may provide an interface which may control or manage system resources.

The middleware 1243 may play a role as, for example, a go-between such that the API 1245 or the application programs 1247 communicate with the kernel 1241 to exchange data. Also, the middleware 1243 may process one or more work requests received from the application programs 1247 in order of priority. For example, the middleware 1243 may assign priority for the use of system resources (e.g., the bus 1210, the processor 1220, the memory 1230, and the like) of the electronic device 1201 to at least one of the application programs 1247. For example, the middleware 1243 may perform scheduling or load balancing for the one or more work requests by processing the one or more work requests in order of priority provided to the at least one of the application programs 1247.

The API 1245 may be, for example, an interface in which the application programs 1247 control a function provided from the kernel 1241 or the middleware 1243. For example, the API 1245 may include at least one interface or function (e.g., instruction) for file control, window control, image processing, text control, and the like.

The input and output interface 1250 may play a role as, for example, an interface which may transmit instructions or data input from a user or another external device to another component (or other components) of the electronic device 1201. Also, input and output interface 1250 may output instructions or data received from another component (or other components) of the electronic device 1201 to the user or the other external device.

The display 1260 may include, for example, a liquid crystal display (LCD), a light emitting diode (LED) display, an organic LED (OLED) display, a microelectromechanical systems (MEMS) display, or an electronic paper display. The display 1260 may display, for example, a variety of content (e.g., text, images, videos, icons, symbols, and the like) to the user. The display 1260 may include a touch screen, and may receive, for example, touch, gesture, proximity, or hovering inputs using an electronic pen or part of a body of the user.

The communication interface 1270 (e.g., a communication module 160 of FIG. 1) may establish communication between, for example, the electronic device 1201 and an external device (e.g., a first external electronic device 1202, a second external electronic device 1204, or a server 1206). For example, the communication interface 1270 may connect to a network 1262 through wireless communication or wired communication, and may communicate with the external device (e.g., the second external electronic device 1204 or the server 1206).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), and the like, as a cellular communication protocol. Also, the wireless communication may include, for example, local-area communication 1264. The local-area communication 1264 may include, for example, at least one of Wi-Fi communication, BT communication, Bluetooth low energy (BLE) communication, Zigbee communication, NFC, magnetic secure transmission communication, GNSS communication, and the like. The GNSS may include, for example, at least one of a global positioning system (GPS), a Glonass, a Beidou navigation satellite system (hereinafter referred to as "Beidou"), or a Galileo (i.e., the European global satellite-based navigation system). Hereinafter, the term "GPS" used herein may be interchangeably used with the term "GNSS".

The wired communication may include, for example, at least one of universal serial bus (USB) communication, high definition multimedia interface (HDMI) communication, recommended standard 232 (RS-232) communication, power line communication, plain old telephone service (POTS) communication, and the like. The network 1262 may include a telecommunications network, for example, at least one of a computer network (e.g., a local area network (LAN) or a wide area network (WAN)), the Internet, or a telephone network.

Each of the first and second external electronic devices 1202 and 1204 may be the same as or different from the electronic device 1201. According to an embodiment, the server 1206 may include a group of one or more servers. According to various embodiments, all or some of the operations executed in the electronic device 1201 may be executed in another electronic device or a plurality of electronic devices (e.g., the first external electronic device 1202, the second external electronic device 1204, or the server 1206). According to an embodiment of the present disclosure, if the electronic device 1201 is to perform any function or service automatically or according to a request, the electronic device 1201 may request another device (e.g., the first external electronic device 1202, the second external electronic device 1204, or the server 1206) to perform at least part of the function or service, rather than executing the function or service itself or in addition to a function or service performed itself. The other electronic device (e.g., the first external electronic device 1202, the second external electronic device 1204, or the server 1206) may execute the requested function or the added function, and may transmit the executed results to the electronic device 1201. The electronic device 1201 may process the received result without change or after performing additional functions, and may provide the requested function or service results. For this purpose, for example, cloud computing technologies, distributed computing technologies, or client-server computing technologies may be used.

Figure 13:
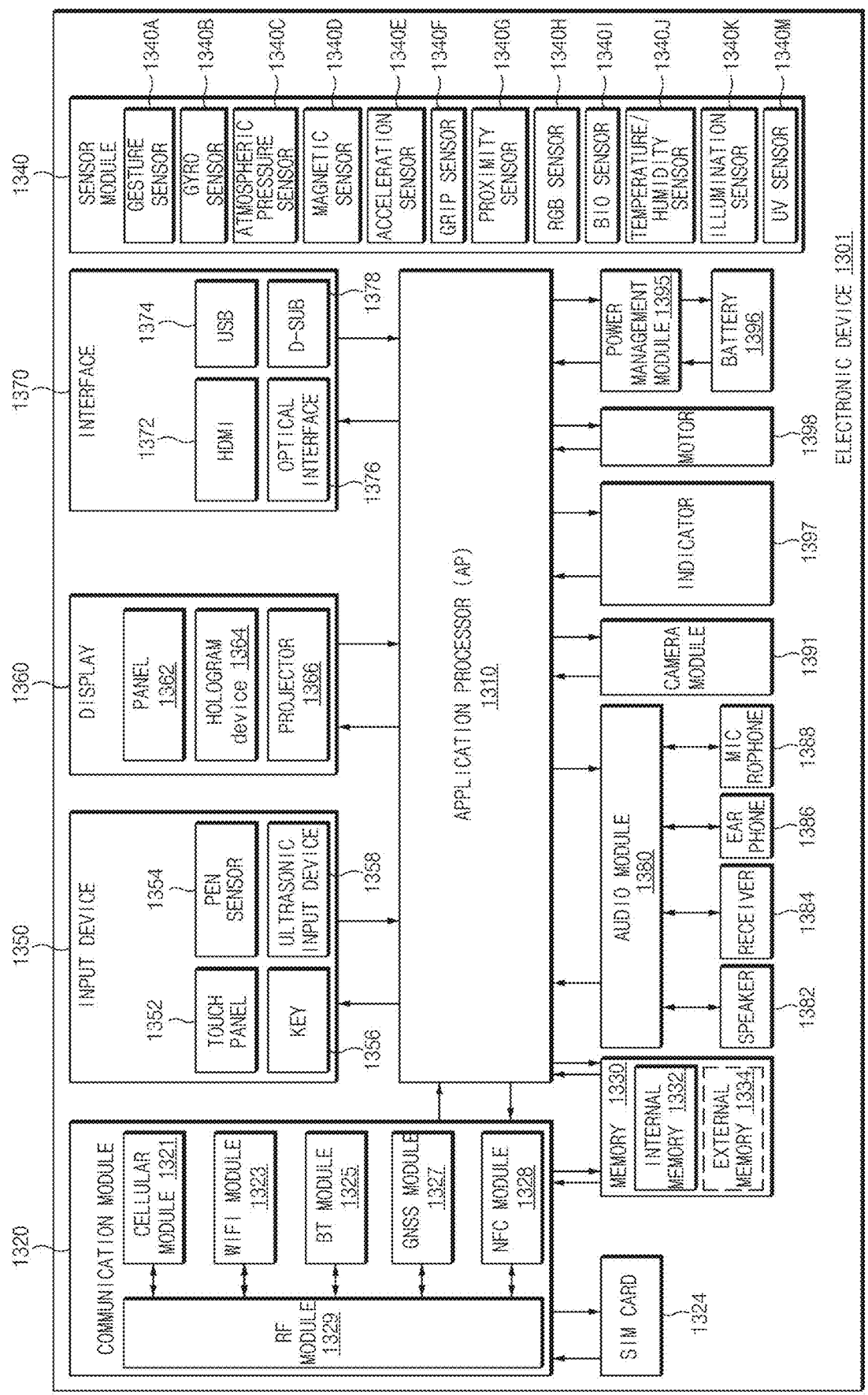
FIG. 13 is a block diagram illustrating a configuration of an electronic device according to various embodiments of the present disclosure.

FIG. 13 is a block diagram illustrating a configuration of an electronic device according to various embodiments of the present disclosure.

Referring to FIG. 13, an electronic device 1301 may include, for example, all or part of an electronic device 100 shown in FIG. 1. The electronic device 1301 may include one or more processors 1310 (e.g., APs), a communication module 1320, a subscriber identification module (SIM) 1324, a memory 1330, a sensor module 1340, an input device 1350, a display 1360, an interface 1370, an audio module 1380, a camera module 1391, a power management module 1395, a battery 1396, an indicator 1397, and a motor 1398.

The processor 1310 may drive, for example, an OS or an application program to control a plurality of hardware or software components connected thereto, and may process and compute a variety of data. The processor 1310 may be implemented with, for example, a SoC. According to an embodiment, the processor 1310 may further include a graphics processing unit (GPU) (not shown) and/or an image signal processor (ISP) (not shown). The processor 1310 may also include at least some (e.g., a cellular module 1321) of the other components shown in FIG. 13. The processor 1310 may load instructions or data received from at least one of the components (e.g., a non-volatile memory) to a volatile memory to process the data, and may store various data and processing results in a non-volatile memory.

The communication module 1320 may have the same or similar configuration to that of a communication interface 1270 of FIG. 12. The communication module 1320 may include, for example, the cellular module 1321, a Wi-Fi module 1323, a BT module 1325, a GNSS module 1327 (e.g., a GPS module, a Glonass module, a Beidou module, or a Galileo module), an NFC module 1328, and a radio frequency (RF) module 1329.

The cellular module 1321 may provide, for example, a voice call service, a video call service, a text message service, an Internet service, and the like, through a communication network. According to an embodiment of the present disclosure, the cellular module 1321 may identify and authenticate the electronic device 1301 in a communication network using the SIM 1324 (e.g., a SIM card). According to an embodiment, the cellular module 1321 may perform at least part of the functions which may be provided by the processor 1310. According to an embodiment, the cellular module 1321 may also include a CP.

According to various embodiments of the present disclosure, at least some (e.g., two or more) of the cellular module 1321, the Wi-Fi module 1323, the BT module 1325, the GNSS module 1327, or the NFC module 1328 may be included in one integrated chip (IC) or in one IC package.

The RF module 1329 may transmit and receive, for example, a communication signal (e.g., an RF signal). Though not shown, the RF module 1329 may include, for example, a transceiver, a power amplifier module (PAM), a frequency filter, a low noise amplifier (LNA), an antenna, and the like. According to another embodiment, at least one of the cellular module 1321, the Wi-Fi module 1323, the BT module 1325, the GNSS module 1327, or the NFC module 1328 may transmit and receive an RF signal through a separate RF module.

The SIM 1324 may include, for example, a card which includes a SIM and/or an embedded SIM. The SIM 1324 may include unique identification information (e.g., an integrated circuit card identifier (ICCID)) or subscriber information (e.g., an international mobile subscriber identity (IMSI)).

The memory 1330 may include, for example, an embedded or internal memory 1332 or an external memory 1334. The embedded memory 1332 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory a NOR flash memory, and the like), a hard drive, or a solid state drive (SSD)).

The external memory 1334 may further include a flash drive, for example, a compact flash (CF), a secure digital (SD), a micro-SD, a mini-SD, an extreme digital (xD), a multimedia card (MMC), a memory stick, and the like. The external memory 1334 may functionally and/or physically connect with the electronic device 1301 through various interfaces.

The sensor module 1340 may measure, for example, a physical quantity or may detect an operation state of the electronic device 1301, and may convert the measured or detected information into an electric signal. The sensor module 1340 may include at least one of, for example, a gesture sensor 1340A, a gyro sensor 1340B, a barometric pressure sensor 1340C, a magnetic sensor 1340D, an acceleration sensor 1340E, a grip sensor 1340F, a proximity sensor 1340G, a color sensor 1340H (e.g., red, green, blue (RGB) sensor), a biometric sensor 1340I, a temperature/humidity sensor 1340J, an illumination sensor 1340K, or an ultraviolet (UV) sensor 1340M. Additionally or alternatively, the sensor module 1340 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), a fingerprint sensor (not shown), and the like. The sensor module 1340 may further include a control circuit for controlling at least one or more sensors included therein. According to various embodiments, the electronic device 1301 may further include a processor configured to control the sensor module 1340, as part of the processor 1310 or to be independent of the processor 1310. Accordingly, while the processor 1310 is in a sleep state, the electronic device 1301 may control the sensor module 1340.

The input device 1350 may include, for example, a touch panel 1352, a (digital) pen sensor 1354, a key 1356, or an ultrasonic input unit 1358. The touch panel 1352 may consist of, for example, at least one of a capacitive type, a resistive type, an IR type, or an ultrasonic type. Also, the touch panel 1352 may further include a control circuit. The touch panel 1352 may further include a tactile layer and may provide a tactile reaction to a user.

The (digital) pen sensor 1354 may be, for example, part of the touch panel 1352 or may include a separate sheet for recognition. The key 1356 may include, for example, a physical button, an optical key, or a keypad. The ultrasonic input unit 1358 may allow the electronic device 1301 to detect a sound wave using a microphone (e.g., a microphone 1388) and to verify data through an input tool generating an ultrasonic signal.

The display module 1360 (e.g., a display 150 of FIG. 1) may include a panel 1362, a hologram device 1364, or a projector 1366. The panel 1362 may include the same or similar configuration to that of the display 1360. The panel 1362 may be implemented to be, for example, flexible, transparent, impact-resistant, and/or wearable. The panel 1362 and the touch panel 1352 may also be integrated into one module. The hologram device 1364 may show a stereoscopic image in a space using interference of light. The projector 1366 may project light onto a screen to display an image. The screen may be positioned, for example, inside or outside of the electronic device 1301. According to an embodiment, the display 1360 may further include a control circuit for controlling the panel 1362, the hologram device 1364, or the projector 1366.

The interface 1370 may include, for example, a HDMI 1372, a USB 1374, an optical interface 1376, or a D-subminiature 1378. The interface 1370 may be included in, for example, a communication interface 1270 shown in FIG. 12. Additionally or alternatively, the interface 1370 may include, for example, a mobile high definition link (MHL) interface, an SD card/MMC interface, or an IR data association (IrDA) standard interface.

The audio module 1380 may convert a sound and an electric signal in dual directions. At least part of the components of the audio module 1380 may be included in, for example, an input and output interface 1250 shown in FIG. 12. The audio module 1380 may process sound information input or output through, for example, a speaker 1382, a receiver 1384, an earphone 1386, the microphone 1388, and the like.

The camera module 1391 may be a device which captures a still image and a moving image. According to an embodiment of the present disclosure, the camera module 1391 may include one or more image sensors (not shown) (e.g., a front sensor or a rear sensor), a lens (not shown), an ISP (not shown), or a flash (not shown) (e.g., an LED or a xenon lamp).

The power management module 1395 may manage, for example, power of the electronic device 1301. According to an embodiment of the present disclosure, though not shown, the power management module 1395 may include a power management integrated circuit (PMIC), a charger IC or a battery or fuel gauge. The PMIC may have a wired and/or wireless charging method. The wireless charging method may include, for example, a magnetic resonance method, a magnetic induction method, an acoustic resonance method, an electromagnetic method, and the like. An additional circuit for wireless charging, for example, a coil loop, a resonance circuit, a rectifier, and the like, may be further provided. The battery gauge may measure, for example, the remaining capacity of the battery 1396 and voltage, current, or temperature thereof while the battery 1396 is charged. The battery 1396 may include, for example, a rechargeable battery or a solar battery.

The indicator 1397 may display a specific state of the electronic device 1301 or part (e.g., the processor 1310) thereof, for example, a booting state, a message state, a charging state, and the like. The motor 1398 may convert an electric signal into mechanical vibration and may generate vibrations, haptic effects, and the like. Though not shown, the electronic device 1301 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 14:
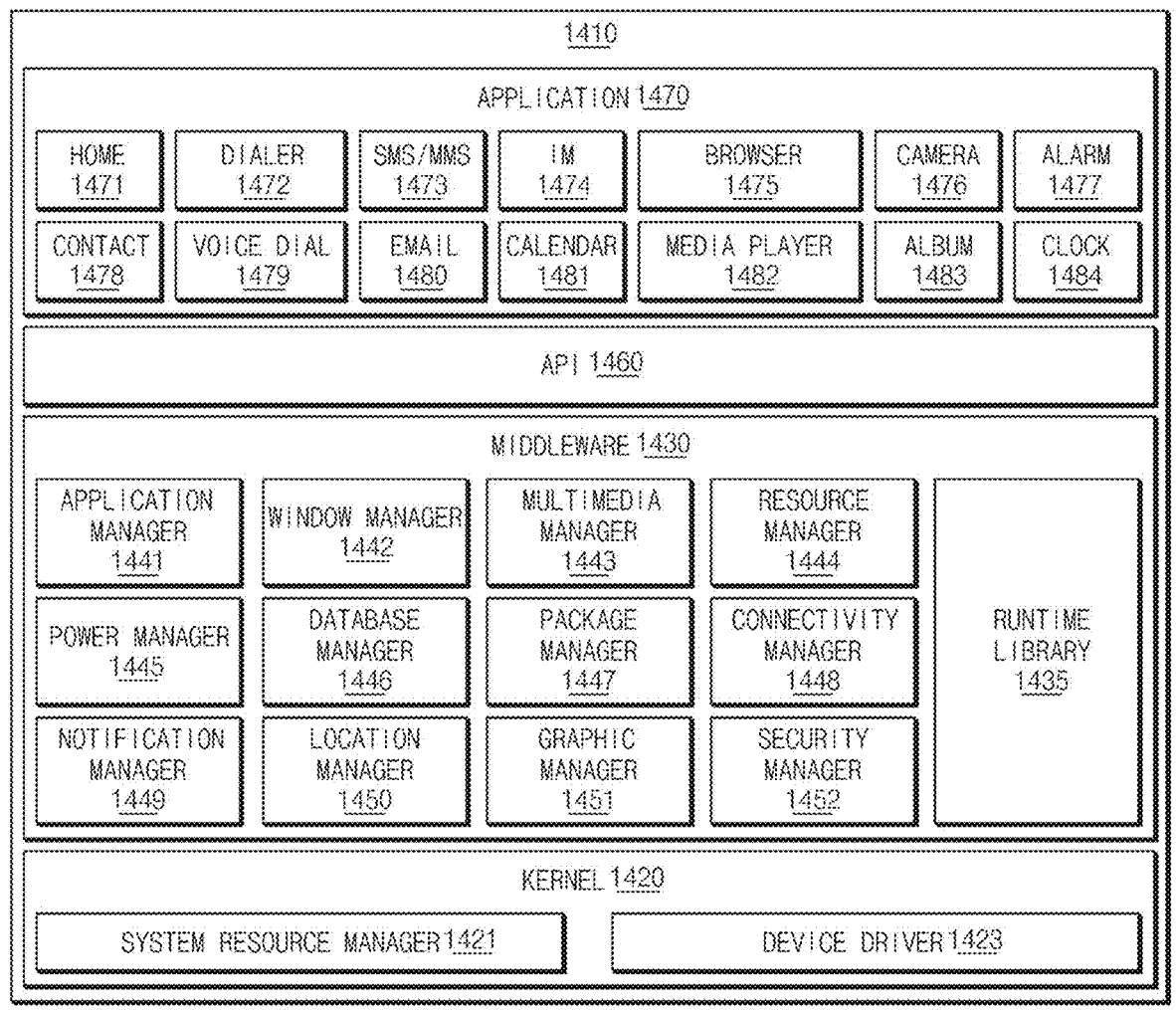
FIG. 14 is a block diagram illustrating a configuration of a program module according to various embodiments of the present disclosure.

FIG. 14 is a block diagram illustrating a configuration of a program module according to various embodiments of the present disclosure.

Referring to FIG. 14, a program module 1410 (e.g., a program 1240 of FIG. 12) may include an OS for controlling resources associated with an electronic device (e.g., an electronic device 1201 of FIG. 12) and/or various applications (e.g., an application program 1247 of FIG. 12) which are executed on the OS. The OS may be, for example, Android, iOS, Windows, Symbian, Tizen, Bada, and the like.

The program module 1410 may include a kernel 1420, a middleware 1430, an API 1460, and/or application 1470. At least part of the program module 1410 may be preloaded on the electronic device, or may be downloaded from an external electronic device (e.g., a first external electronic device 1202, a second external electronic device 1204, a server 1206, and the like of FIG. 12).

The kernel 1420 (e.g., a kernel 1241 of FIG. 12) may include, for example, a system resource manager 1421 and/or a device driver 1423. The system resource manager 1421 may control, assign, collect, and the like, system resources. According to an embodiment of the present disclosure, the system resource manager 1421 may include a process management unit, a memory management unit, a file system management unit, and the like. The device driver 1423 may include, for example, a display driver, a camera driver, a BT driver, a shared memory driver, a USB driver, a keypad driver, a Wi-Fi driver, an audio driver, or an inter-process communication (IPC) driver.

The middleware 1430 (e.g., a middleware 1243 of FIG. 12) may provide, for example, functions the application 1470 needs in common, and may provide various functions to the application 1470 through the API 1460 such that the application 1470 efficiently uses limited system resources in the electronic device. According to an embodiment, the middleware 1430 (e.g., the middleware 1243) may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, or a security manager 1452.

The runtime library 1435 may include, for example, a library module used by a compiler to add a new function through a programming language while the application 1470 is executed. The runtime library 1435 may perform functions regarding input and output management, memory management, or an arithmetic function.

The application manager 1441 may manage, for example, a life cycle of at least one of the application 1470. The window manager 1442 may manage graphical user interface (GUI) resources used on a screen of the electronic device. The multimedia manager 1443 may ascertain a format necessary for playing various media files, and may encode or decode a media file using a codec corresponding to the corresponding format. The resource manager 1444 may manage source codes of at least one of the application 1470, and may manage resources of a memory, a storage space, and the like.

The power manager 1445 may act together with, for example, a basic input/output system (BIOS) and the like, may manage a battery or a power source, and may provide power information necessary for an operation of the electronic device. The database manager 1446 may generate, search, or change a database to be used in at least one of the application 1470. The package manager 1447 may manage installation or update of an application distributed by type of package file.

The connectivity manager 1448 may manage, for example, wireless connection such as Wi-Fi connection, BT connection, and the like. The notification manager 1449 may display or notify events, such as an arrival message, an appointment, and proximity notification, by a method which is not disturbed to the user. The location manager 1450 may manage location information of the electronic device. The graphic manager 1451 may manage a graphic effect to be provided to the user or a user interface (UI) related to the graphic effect. The security manager 1452 may provide security functions necessary for system security, user authentication, and the like. According to an embodiment of the present disclosure, when the electronic device (e.g., the electronic device 1201) has a phone function, the middleware 1430 may further include a telephony manager (not shown) for managing a voice or video communication function of the electronic device.

The middleware 1430 may include a middleware module which configures combinations of various functions of the above-described components. The middleware 1430 may provide a module which specializes according to kinds of OSs to provide a differentiated function. Also, the middleware 1430 may dynamically delete some old components and/or may add new components.

The API 1460 (e.g., an API 1245 of FIG. 12) may be, for example, a set of API programming functions, and may be provided with different components according to OSs. For example, in the case of Android or iOS, one API set may be provided according to platforms. In the case of Tizen, two or more API sets may be provided according to platforms.

The application 1470 (e.g., an application program 1247 of FIG. 12) may include one or more of, for example, a home application 1471, a dialer application 1472, a SMS/multimedia message service (MIMS) application 1473, an instant message (IM) application 1474, a browser application 1475, a camera application 1476, an alarm application 1477, a contact application 1478, a voice dial application 1479, an e-mail application 1480, a calendar application 1481, a media player application 1482, an album application 1483, a clock application 1484, a health care application (e.g., an application for measuring quantity of exercise or blood sugar, and the like), an environment information application (e.g., an application for providing atmospheric pressure information, humidity information, or temperature information), and the like.

According to an embodiment of the present disclosure, the application 1470 may include an application (hereinafter, for better understanding and ease of description, referred to as "information exchange application") for exchanging information between the electronic device (e.g., the electronic device 1201) and an external electronic device (e.g., the first external electronic devices 1202 or the second external electronic device 1204). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, the environment information application, and the like) of the electronic device, to the external electronic device (e.g., the first external electronic devices 1202 or the second external electronic device 1204). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic devices 1202 or the second external electronic device 1204) which communicates with the electronic device, an application which operates in the external electronic device, or a service (e.g., a call service or a message service) provided from the external electronic device.

According to an embodiment of the present disclosure, the application 1470 may include an application (e.g., a health card application of a mobile medical device) which is preset according to attributes of the external electronic device (e.g., the first external electronic devices 1202 or the second external electronic device 1204).

According to an embodiment of the present disclosure, the application 1470 may include an application received from the external electronic device (e.g., the server 1206, the first external electronic devices 1202, or the second external electronic device 1204). According to an embodiment of the present disclosure, the application 1470 may include a preloaded application or a third party application which may be downloaded from a server. Names of the components of the program module 1410 according to various embodiments of the present disclosure may differ according to kinds of OSs.

According to various embodiments of the present disclosure, at least part of the program module 1410 may be implemented with software, firmware, hardware, or at least two or more combinations thereof. At least part of the program module 1410 may be implemented (e.g., executed) by, for example, a processor (e.g., a processor 1220 of FIG. 12). At least part of the program module 1410 may include, for example, a module, a program, a routine, sets of instructions, a process, and the like, for performing one or more functions.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

The terminology "module" used herein may mean, for example, a unit including one of hardware, software, and firmware or two or more combinations thereof. The terminology "module" may be interchangeably used with, for example, terminologies "unit", "logic", "logical block", "component", "circuit", and the like. The "module" itself may be a minimum unit of an integrated component or a part thereof. The "module" may also be a minimum unit performing one or more functions or a part thereof. The "module" may also be mechanically and/or electronically implemented. For example, the "module" may include at least one of an application-specific integrated circuit (ASIC) chip, field-programmable gate arrays (FPGAs), or a programmable-logic device, which are well known or will be developed in the future, for performing certain operations.

According to various embodiments of the present disclosure, at least part of a device (e.g., modules or the functions) or a method (e.g., operations) may be implemented with, for example, instructions stored in non-transitory computer-readable storage media which have a program module. When the instructions are executed by a processor (e.g., a processor 170 of FIG. 1), one or more processors may perform functions corresponding to the instructions.

The computer-readable storage media may include a hard disc, a floppy disk, magnetic media (e.g., a magnetic tape), optical media (e.g., a compact disc-ROM (CD-ROM) and a DVD), magneto-optical media (e.g., a floptical disk), a hardware device (e.g., a ROM, a RAM, or a flash memory), and the like. Also, the program instructions may include not only mechanical codes compiled by a compiler, but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

According to various embodiments of the present disclosure, the user of the electronic device may group a plurality of images into one file and may manage the one file, thus playing, managing, and sharing the images easily. Also, the user may conveniently appreciate a plurality of photos included in the grouped file.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A portable electronic device, comprising:
   a camera;
   a memory configured to store a plurality of images captured by the camera;
   a touch screen display; and
   a processor configured to:
   control the touch screen display to display a menu for selecting, by a user, an image selection condition from a plurality of image selection conditions displayed on the menu, wherein the image selection condition is a characteristic of at least some images of the plurality of images,
   select at least two images of the plurality of images based on the selected image selection condition,
   arrange the selected images based on at least one of a time when each of the images is captured by the camera, a place where each of the images is captured, a person included in each of the images, a tag inserted into each of the images, or an image pattern,
   generate a single combination image file in a format for sequentially playing the arranged images by combining the arranged images,
   divide a part of the touch screen display on which the single combination image file is displayed into a plurality of regions corresponding to a number of images included in the single combination image file, and
   control the touch screen display to display an image corresponding to a region of the part of the display on which a user operation is input if the user operation is input on the region of the part of the display on which the single combination image file is displayed.

2. The portable electronic device of claim 1, wherein the processor is further configured to:
   compress the selected images, and
   generate the single combination image file by combining the compressed images.

3. The portable electronic device of claim 1,
   wherein the touch screen display is further configured to display a user interface for setting the image selection condition, and
   wherein the image selection condition comprises at least one of a time when an image is captured, a place where the image is captured, a person included in the image, a tag inserted into the image, or an image pattern.

4. The portable electronic device of claim 1,
   wherein the touch screen display is further configured to receive the first user input and to receive a second user input for setting the image selection condition, and
   wherein the processor is further configured to select the at least two images of the plurality of images based on the image selection condition.

5. The portable electronic device of claim 1, further comprising:
   a transceiver configured to communicate with an external device,
   wherein the processor is further configured to transmit the single combination image file stored in the memory to the external device.

6. The portable electronic device of claim 1, wherein the processor is further configured to control the touch screen display to:
  play the single combination image file stored in the memory, and
  display the single combination image file on at least a part of the display.

7. The portable electronic device of claim 6, wherein the processor is further configured to control the touch screen display to sequentially display a plurality of images, included in the single combination image file, at determined time intervals.

8. The portable electronic device of claim 6, wherein the processor is further configured to control the touch screen display to display images in an order corresponding to a user operation on the display if the user operation is input on the part of the display on which the single combination image file is displayed.

9. The portable electronic device of claim 1, wherein the plurality of image selection conditions comprises at least two of a time, a place, a person, a tag, or an image pattern.

10. A method for generating an image file in a portable electronic device, the method comprising:
  displaying a menu for selecting, by a user, an image selection condition from a plurality of image selection conditions displayed on the menu, wherein the image selection condition is a characteristic of at least some images of the plurality of images;
  selecting, by at least one processor, at least two images of the plurality of images which are discontinuously captured and are stored in a memory based on the selected image selection condition;
  arranging, by the at least one processor, the selected images based on at least one of a time when each of the images is captured, a place where each of the images is captured by a camera, a person included in each of the images, a tag inserted into each of the images, or an image pattern;
  generating, by the at least one processor, a single combination image file in a format for sequentially playing the arranged images by combining the arranged images;
  displaying, on a touch screen display, two arranged images, which are arranged by the at least one processor, of the single combination image file;
  dividing a part of the display which displays the single combination image file into a plurality of regions corresponding to a number of images included in the single combination image file; and
  displaying an image corresponding to the part of the touch screen display on which a user operation is input, if the user operation is input on the part of the touch screen display on which the single combination image file is displayed.

11. The method of claim 10, wherein the generating of the single combination image file comprises:
  compressing the selected images; and
  generating the single combination image file by combining the compressed images.

12. The method of claim 10, further comprising:
  displaying, on the touch screen display, a user interface for setting the image selection condition,
  wherein the image selection condition comprises at least one of a time when an image is captured, a place where the image is captured, a person included in the image, a tag inserted into the image, or an image pattern.

13. The method of claim 10, wherein the selecting of at least the some of the plurality of images comprises:
  receiving a second user input for setting the image selection condition; and
  selecting the at least two images of the plurality of images based on the image selection condition.

14. The method of claim 10, further comprising:
  playing the single combination image file stored in the memory; and
  displaying the single combination image file on at least a part of the touch screen display.

15. The method of claim 14, wherein the displaying of the single combination image file on the part of the touch screen display comprises:
  sequentially displaying a plurality of images included in the single combination image file at determined time intervals.

16. The method of claim 14, wherein the displaying of the single combination image file on the part of the touch screen display comprises:
  displaying images in an order corresponding to a user operation on the touch screen display, if the user operation is input on the part of the display on which the single combination image file is displayed.

17. A non-transitory computer-readable recording medium configured to store one or more computer programs including instructions that, when executed by at least one processor in a portable electronic device, cause the at least one processor to control for:
  displaying a menu for selecting, by a user, an image selection condition from a plurality of image selection conditions displayed on the menu, wherein the image selection condition is a characteristic of at least some images of a plurality of images;
  selecting at least two images of the plurality of images which are discontinuously captured and are stored in a memory based on the selected image selection condition;
  arranging the selected images based on at least one of a time when each of the images is captured by a camera, a place where each of the images is captured, a person included in each of the images, a tag inserted into each of the images, or an image pattern;
  generating a single combination image file in a format for sequentially playing the arranged images by combining the arranged images;
  displaying two arranged images, which are arranged by the at least one processor, of the single combination image file;
  dividing a part of the display which displays the single combination image file into a plurality of regions corresponding to a number of images included in the single combination image file; and
  displaying an image corresponding to the part of the touch screen display on which a user operation is input, if the user operation is input on the part of the touch screen display on which the single combination image file is displayed.

* * * * *